United States Patent
Aoki et al.

(10) Patent No.: US 9,646,272 B2
(45) Date of Patent: May 9, 2017

(54) OPERATION SCHEDULE EVALUATION APPARATUS AND OPERATION SCHEDULE PROCESSING SYSTEM

(71) Applicant: Mitsubishi Electric Corporation, Chiyoda-ku (JP)

(72) Inventors: Atsuko Aoki, Tokyo (JP); Kenji Ueda, Tokyo (JP); Satoru Takahashi, Tokyo (JP); Masahiko Tanimoto, Tokyo (JP); Yusaku Nagasaki, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 212 days.

(21) Appl. No.: 14/435,307

(22) PCT Filed: Oct. 29, 2013

(86) PCT No.: PCT/JP2013/079180
§ 371 (c)(1),
(2) Date: Apr. 13, 2015

(87) PCT Pub. No.: WO2014/073412
PCT Pub. Date: May 15, 2014

(65) Prior Publication Data
US 2015/0262101 A1    Sep. 17, 2015

(30) Foreign Application Priority Data

Nov. 8, 2012 (JP) ................. 2012-245898

(51) Int. Cl.
*B61L 27/00* (2006.01)
*G06Q 10/06* (2012.01)

(52) U.S. Cl.
CPC .... *G06Q 10/06311* (2013.01); *B61L 27/0027* (2013.01)

(58) Field of Classification Search
None
See application file for complete search history.

(56) References Cited

U.S. PATENT DOCUMENTS 3,284,627 A * 11/1966 Wilcox ..................... B61L 3/22
                                                           177/211
6,144,901 A * 11/2000 Nickles ................ B60T 13/665
                                                           701/19

(Continued)

FOREIGN PATENT DOCUMENTS

CN    101844571 A    9/2010
CN    102360401 A    2/2012

(Continued)

OTHER PUBLICATIONS

Combined Office Action and Search Report issued Dec. 16, 2015 in Chinese Patent Application No. 201380058183.6 (with partial English language translation).

(Continued)

*Primary Examiner* — Shelley Chen
(74) *Attorney, Agent, or Firm* — Oblon, McClelland, Maier & Neustadt, L.L.P.

(57) ABSTRACT

A technique which comprehensively optimize passengers' convenience and a power consumption amount. An operation schedule evaluation apparatus has a passenger flow calculator and a power consumption amount calculator. The passenger flow calculator creates passenger flow information related to a passenger flow generated by transportation of a train, based on operation schedule information of each train and passenger information related to an entry and an exit of a passenger at a station. The power consumption amount calculator calculates the number of passengers or a car occupancy of each train based on the passenger flow information created by the passenger flow calculator, the operation schedule information and car information of each (Continued)

train, and calculates a power consumption amount of each train per unit time which reflects car weight corresponding to the number of passengers or the car occupancy.

13 Claims, 20 Drawing Sheets

(56) References Cited

U.S. PATENT DOCUMENTS

| | | | | |
|---|---|---|---|---|
| 2005/0251299 | A1* | 11/2005 | Donnelly | B60L 7/08 701/19 |
| 2009/0177344 | A1* | 7/2009 | James | B61L 27/0038 701/19 |
| 2012/0072088 | A1* | 3/2012 | Cutright | B60T 17/228 701/70 |
| 2012/0173444 | A1* | 7/2012 | Zik | G06Q 10/10 705/317 |
| 2013/0168503 | A1* | 7/2013 | Cooper | B61L 15/0027 246/167 R |

FOREIGN PATENT DOCUMENTS

| | | |
|---|---|---|
| JP | 5-16808 | 1/1993 |
| JP | 8-314987 A | 11/1996 |
| JP | 2000-95111 A | 4/2000 |
| JP | 2001-55145 A | 2/2001 |
| JP | 2006-76458 | 3/2006 |
| JP | 2007-15424 A | 1/2007 |
| JP | 2007-118674 A | 5/2007 |
| JP | 2010-18221 A | 1/2010 |
| JP | 2011-31803 A | 2/2011 |

OTHER PUBLICATIONS

Tao Chen, "Calculation methods of high-speed train operation energy consumption and qualification analysis of the impact factors thereof" Wanfang Dissertation Database, Nov. 30, 2011, 82 Pages.
International Search Report Issued Nov. 26, 2013 in PCT/JP13/079180 Filed Oct. 29, 2013.
International Preliminary Report on Patentability and Written Opinion issued May 21, 2015 in PCT/JP2013/079180 (with English language translation).

* cited by examiner

FIG. 2

| SCHEDULE ID | 201208W | 201208W | 201208W | 201208W |
|---|---|---|---|---|
| TRAIN CODE | 251M | 1003M | 253M | 255M |
| STATION A | 9:50:00 | 9:52:15 | 9:58:15 | 10:05:30 |
| STATION B | 9:52:30 | — | 10:00:45 | 10:08:00 |
| STATION C | 9:55:00 | — | 10:03:15 | 10:10:30 |
| STATION D | 9:58:15 | 9:55:45 | 10:06:30 | 10:13:45 |
| STATION E | 10:00:45 | — | 10:09:00 | 10:16:15 |
| ARRIVE AT STATION F | 10:05:00 | 10:03:00 | 10:13:15 | 10:20:30 |
| DEPART FROM STATION F | 10:05:45 | 10:04:00 | 10:14:00 | 10:21:15 |
| STATION G | 10:08:00 | — | 10:16:15 | 10:23:30 |

FIG. 3

| SCHEDULE ID | 201208W | 201208W | 201208W | 201208W |
|---|---|---|---|---|
| TRAIN CODE | 251M | 1003M | 253M | 255M |
| CAR NUMBER | 6 | 8 | 6 | 6 |
| CAR TYPE | 101F | 2007F+2031F | 119F | 167F |

FIG. 4

| PASSENGER ID | ENTRY STATION | ENTRY TIME | EXIT STATION | EXIT TIME |
|---|---|---|---|---|
| 1587925 | STATION A | 9:45:27 | STATION C | 9:58:55 |
| 5843813 | STATION D | 9:48:34 | STATION F | 10:10:41 |
| 2791188 | STATION D | 9:50:01 | STATION F | 10:04:38 |
| 5487311 | STATION B | 9:50:22 | STATION F | 10:05:20 |
| 9963781 | STATION A | 9:51:17 | STATION D | 9:57:17 |
| 4857330 | STATION A | 9:53:26 | STATION G | 10:17:06 |

FIG. 5

| PASSENGER ID | TRAIN CODE1 | BOARDING STATION | GETTING-OFF STATION | TRAIN CODE2 | BOARDING STATION | GETTING-OFF STATION | REQUIRED TIME |
|---|---|---|---|---|---|---|---|
| 1587925 | 251M | STATION A | STATION C | | | | 0:09:33 |
| 5843813 | 1003M | STATION D | STATION F | | | | 0:16:26 |
| 2791188 | 1003M | STATION D | STATION F | | | | 0:12:59 |
| 5487311 | 251M | STATION B | STATION D | 1003M | STATION D | STATION F | 0:12:38 |
| 9963781 | 1003M | STATION A | STATION D | | | | 0:04:28 |
| 4857330 | 253M | STATION A | STATION G | | | | 0:22:49 |

F I G. 6

| SCHEDULE ID | 201208W | | 201208W | | 201208W | | 201208W | |
|---|---|---|---|---|---|---|---|---|
| PASSENGER FLOW ID | Weekday_S | | Weekday_S | | Weekday_S | | Weekday_S | |
| TRAIN CODE | 251M | | 1003M | | 253M | | 255M | |
| TIME | CONSUMPTION | REGENERATION | CONSUMPTION | REGENERATION | CONSUMPTION | REGENERATION | CONSUMPTION | REGENERATION |
| 10:00:00 | 0.00 | 0.00 | 0.00 | 0.00 | 0.00 | 0.00 | 0.00 | 0.00 |
| 10:00:05 | 5.00 | 0.00 | 0.00 | 1.00 | 5.00 | 0.00 | 0.00 | 0.00 |
| 10:00:10 | 5.00 | 0.00 | 0.00 | 1.00 | 5.00 | 0.00 | 0.00 | 0.00 |
| 10:00:15 | 0.00 | 2.00 | 0.00 | 0.00 | 0.00 | 2.00 | 0.00 | 0.00 |
| 10:00:20 | 0.00 | 5.00 | 0.00 | 0.00 | 0.00 | 5.00 | 0.00 | 0.00 |
| 10:00:25 | 0.00 | 8.00 | 0.00 | 0.00 | 0.00 | 8.00 | 0.00 | 0.00 |
| 10:00:30 | 0.00 | 8.00 | 0.00 | 0.00 | 0.00 | 8.00 | 0.00 | 0.00 |

F I G. 1 2
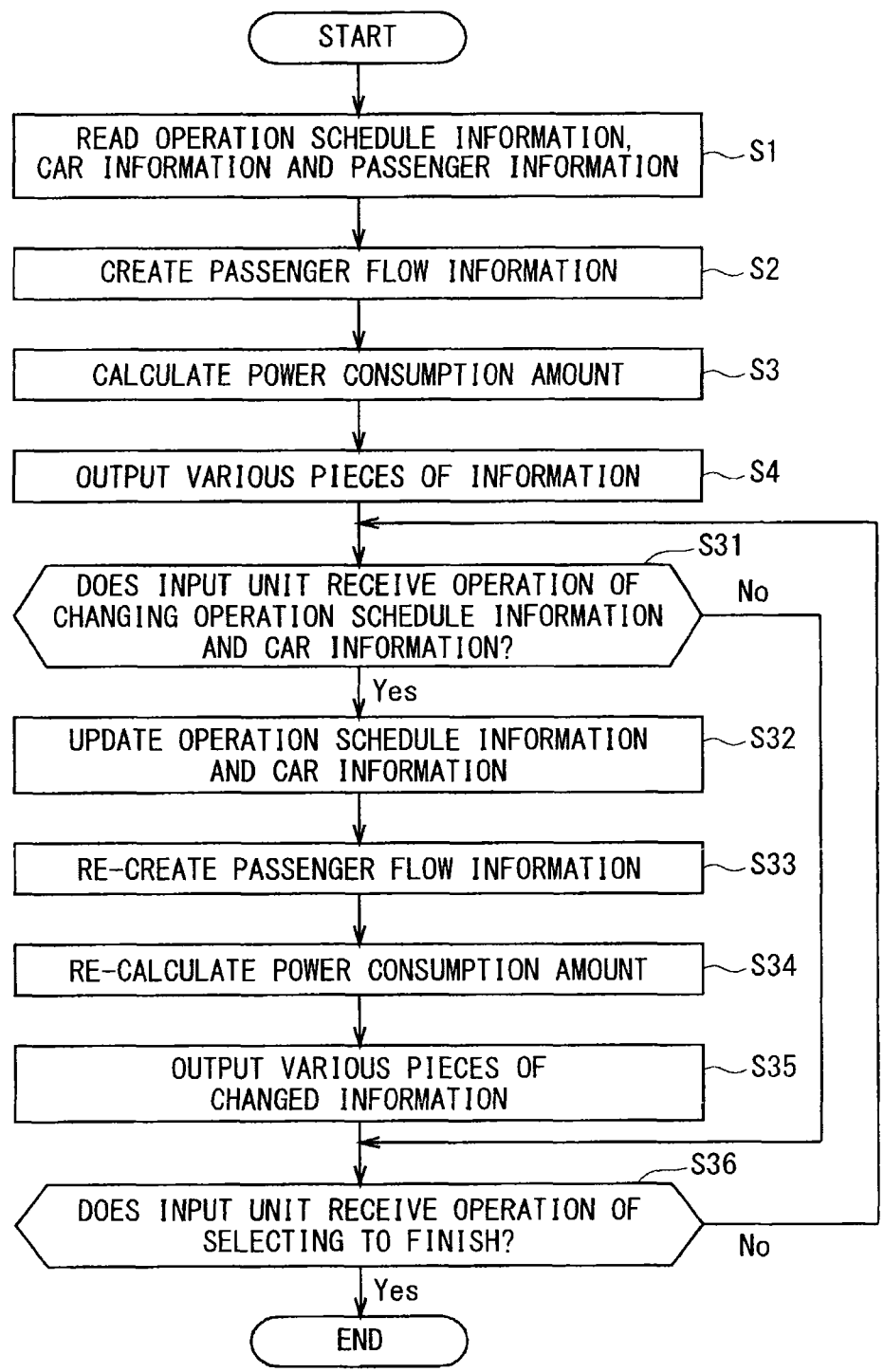

FIG. 15

| | REDUCTION TIME BAND | TARGET POWER AMOUNT | ALLOWABLE CAR OCCUPANCY | PRIORITY ITEM | CURTAIL | CHANGE OF TRAIN SET | INTEGRATE/ DIVIDE | CHANGE OF TIME INTERVAL |
|---|---|---|---|---|---|---|---|---|
| PATTERN A | 10-16 | -15% | | POWER CONSUMPTION AMOUNT | 1 | 1 | 1 | 1 |
| PATTERN B | 10-16 | -15% | 150% | PASSENGER FLOW | 1 | 1 | 1 | 1 |
| PATTERN C | 10-16 | -10% | 180% | POWER CONSUMPTION AMOUNT | 0 | 1 | 1 | 1 |
| PATTERN D | 15-24 | | 180% | PASSENGER FLOW | 0 | 0 | 0 | 1 |

FIG. 21

| FACILITY ID | FACILITY TYPE NAME | FACILITY PLACE | RATED OUTPUT/ CAPACITY | SUSTAINABLE OUTPUT TIME | STANDBY TIME | THRESHOLD VOLTAGE | REFERENCE VOLTAGE | MANUFACTURING DATE |
|---|---|---|---|---|---|---|---|---|
| LIB178 | BATTERY | STATION B | 200kW | — | — | — | — | 2011/06 |
| LIB256 | BATTERY | STATION E | 300kW | — | — | — | — | 2013/02 |
| SEIV001 | STATION BUILDING AUXILIARY POWER SOURCE DEVICE | STATION A | 200kW | 30sec | 180sec | 1700V | — | 2013/05 |
| SEIV002 | STATION BUILDING AUXILIARY POWER SOURCE DEVICE | STATION E | 200kW | 30sec | 180sec | 1700V | — | 2013/09 |
| TREC001 | FEEDING OPTIMAL CONTROL SYSTEM | ELECTRICAL SUBSTATION X | — | — | — | — | 1500V | 2014/02 |

FIG. 23

| SCHEDULE ID | 201208W | | | | 201208W | | | | 201208W | | | | 201208W | | | |
|---|---|---|---|---|---|---|---|---|---|---|---|---|---|---|---|---|
| PASSENGER ID | Weekday_S | | | | Weekday_S | | | | Weekday_S | | | | Weekday_S | | | |
| TRAIN CODE | 251M | | | | 1003M | | | | 253M | | | | 255M | | | |
| TIME | CONSUMPTION | REGENERATION | LOSS | UTILIZATION | CONSUMPTION | REGENERATION | LOSS | UTILIZATION | CONSUMPTION | REGENERATION | LOSS | UTILIZATION | CONSUMPTION | REGENERATION | LOSS | UTILIZATION |
| 10:00:00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 10:00:05 | 0.00 | 5.00 | 0.00 | 2.00 | 1.00 | 0.00 | 0.00 | 0.00 | 0.00 | 3.00 | 0.00 | 2.00 | 0.00 | 0.00 | 0.00 | 0.00 |
| 10:00:10 | 0.00 | 5.00 | 0.00 | 1.00 | 1.00 | 0.00 | 0.00 | 0.00 | 0.00 | 4.00 | 1.00 | 0.00 | 0.00 | 0.00 | 0.00 | 0.00 |
| 10:00:15 | 2.00 | 0.00 | 0.00 | 0.00 | 1.00 | 0.00 | 0.00 | 0.00 | 2.00 | 0.00 | 0.00 | 0.00 | 0.00 | 0.00 | 0.00 | 0.00 |
| 10:00:20 | 5.00 | 0.00 | 0.00 | 0.00 | 0.00 | 0.00 | 0.00 | 0.00 | 5.00 | 0.00 | 0.00 | 0.00 | 0.00 | 0.00 | 0.00 | 0.00 |
| 10:00:25 | 6.00 | 0.00 | 0.00 | -2.00 | 0.00 | 0.00 | 0.00 | 0.00 | 6.00 | 0.00 | 0.00 | -2.00 | 0.00 | 0.00 | 0.00 | 0.00 |
| 10:00:30 | 6.00 | 0.00 | 0.00 | -2.00 | 0.00 | 0.00 | 0.00 | 0.00 | 6.00 | 0.00 | 0.00 | -2.00 | 0.00 | 0.00 | 0.00 | 0.00 |

OPERATION SCHEDULE EVALUATION APPARATUS AND OPERATION SCHEDULE PROCESSING SYSTEM

TECHNICAL FIELD

The present invention relates to an operation schedule evaluation apparatus which evaluates train operation schedules, and an operation schedule processing system which has the operation schedule evaluation apparatus.

BACKGROUND ART

A railway system has a train operation schedule which is operated every day and is fixed for a certain period of time, yet needs to undergo an operation of changing the operation schedule when some operation failures such as failure of a device or occurrence of an accidence occur even in this certain period of time. Further, in recent years, issuance of a power-use-regulation order and a power-saving request from power electric companies require that railway operators adequately create special schedules of the reduced number of operating trains to adequately reduce a power consumption amount. In view of the above situation, various techniques of adequately and easily changing operation schedules are being proposed.

For example, Patent Document 1 proposes a technique of automatically creating operation schedules by curtailing the number of trains from an original operation schedule when curtail parameters are specified.

Further, generally speaking, when an operation schedule is changed, a tight operation state where multiple trains run in narrow sections in a short time appears in a time zone in which an operation is resumed and then returns to a normal operation schedule, and a power consumption amount rapidly increases. Hence, for example, Patent Document 2 proposes a technique of estimating a future power consumption amount and automatically changing an operation schedule such that the power consumption amount does not exceed an upper limit value of the power consumption amount set in advance.

Further, as one method of reducing the power consumption amount, a recent railway system actively adopts a power regeneration technique of converting running energy into electrical energy when a running train stops and recovering the energy. Also, for example, Patent Document 3 proposes a technique of calculating a power consumption amount and a regenerated power amount per predetermined section, and creating an operation schedule for effectively utilizing regenerated power.

PRIOR ART DOCUMENT

Patent Documents

Patent Document 1: Japanese Patent Application Laid-Open No. 2000-95111
Patent Document 2: Japanese Patent Application Laid-Open No. 5-16808 (1993)
Patent Document 3: Japanese Patent Application Laid-Open No. 2006-76458

SUMMARY OF INVENTION

Problems to be Solved by the Invention

However, although the technique of Patent Document 1 takes into account train operations, the technique does not take into account passenger flow at all. Therefore, according to the technique, it is possible to undermine passengers' convenience.

Further, the technique of Patent Document 2 adopts a method of calculating a power consumption amount based only on the number of cars and a running distance, and does not take into account an influence of the number of passengers of each car on a power consumption amount. Therefore, the technique has a problem that accuracy to predict the power consumption amount is low. Similarly, the technique of Patent Document 3 also has a problem that accuracy to predict a power consumption amount is low since the technique does not take into account an influence of the number of passengers of each train on the power consumption amount upon calculation of the power consumption amount.

The present invention has been made in light of the above problem. It is therefore an object of the present invention to provide a technique which comprehensively optimizes passengers' convenience and a power consumption amount.

Means for Solving the Problems

An operation schedule evaluation apparatus according to the present invention includes: a passenger flow calculator which creates passenger flow information related to a passenger flow generated by transportation of a train, based on operation schedule information of each train and passenger information related to an entry and an exit of a passenger at a station; and a power consumption amount calculator which calculates the number of passengers or a car occupancy of each train based on the passenger flow information created by the passenger flow calculator, the operation schedule information and car information of each train, and calculates a power consumption amount of each train per unit time which reflects car weight corresponding to the number of passengers or the car occupancy.

Effects of the Invention

The present invention creates passenger flow information based on operation schedule information and passenger information, and calculates a power consumption amount by taking into account the passenger flow information. Consequently, it is possible to comprehensively optimize passengers' convenience and the power consumption amount.

BRIEF DESCRIPTION OF DRAWINGS

FIG. 2 is a view showing operation schedule information according to the first embodiment.

FIG. 3 is a view showing car information according to the first embodiment.

FIG. 4 is a view showing passenger information according to the first embodiment.

FIG. 5 is a view showing passenger flow information according to the first embodiment.

FIG. 6 is a view showing power consumption amount information according to the first embodiment.

FIG. 12 is a flowchart showing an operation of the operation schedule processing system according to the second embodiment.

FIG. 15 is a view showing restriction condition information according to the third embodiment.

FIG. 21 is a view showing facility information according to the fifth embodiment.

FIG. 23 is a view showing power consumption amount information according to the fifth embodiment.

DESCRIPTION OF EMBODIMENT

First Embodiment

Figure 1:
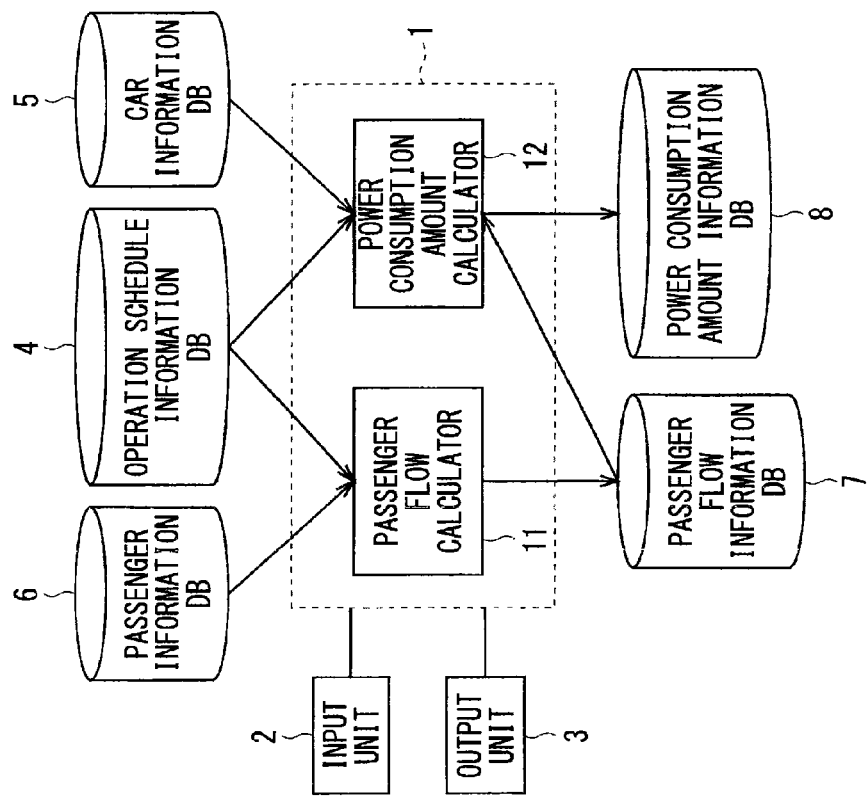
FIG. 1 is a block diagram showing a configuration of an operation schedule processing system according to a first embodiment.

FIG. 1 is a block diagram showing a configuration of an operation schedule processing system which has an operation schedule evaluation apparatus according to the first embodiment of the present invention.

As shown in FIG. 1, the operation schedule processing system is configured to include an operation schedule evaluation apparatus 1, an input unit 2 and an output unit 3 which are man-machine interfaces, and an operation schedule information DB (database) 4, a car information DB (database) 5, a passenger information DB (database) 6, a passenger flow information DB (database) 7 and a power consumption amount information DB (database) 8 which are each a storage area.

The operation schedule evaluation apparatus 1 is configured to include a passenger flow calculator 11 and a power consumption amount calculator 12. The operation schedule evaluation apparatus 1 can connect with the input unit 2 and the output unit 3, and can communicate with (access to) the operation schedule information DB 4, the car information DB 5, the passenger information DB 6, the passenger flow information DB 7 and the power consumption amount information DB 8 through the Internet or the like. In this regard, the operation schedule information DB 4, the car information DB 5, the passenger information DB 6, the passenger flow information DB 7 and the power consumption amount information DB 8 are individually realized, yet are not limited to these. For example, the same function as those of these two or more databases may be realized by one database.

The input unit 2 is configured by an interface (e.g. a keyboard and a mouse) which an operator of the operation schedule processing system uses to input various pieces of information to the operation schedule evaluation apparatus 1.

The output unit 3 is configured by an interface (e.g. a display or a printer) which outputs various pieces of information from the operation schedule evaluation apparatus 1.

The operation schedule information DB 4 stores operation schedule information of each train. As shown in FIG. 2, the operation schedule information according to the present embodiment includes schedule IDs for specifying operation schedules, train codes for specifying each train and arrival/departure times of each train at each station. In this regard, "-" shown in FIG. 2 means that a train assigned "-" passes a station without stopping. In addition, the operation schedule information is not limited to the information shown in FIG. 2, and may be information further including a shuttle station, an evacuation station and a passing time of a non-stop station. Schedule is a concept including a diagram.

The car information DB 5 stores car information of each train. As shown in FIG. 3, the car information according to the present embodiment includes train codes for specifying each train, the number of cars (car number) which make up each train and a type (car type). In addition, the car information is not limited to the information shown in FIG. 3, and may be information further including cars (spare cars) which are available on an operation day and whether or not a train set can be divided.

The passenger information DB 6 stores passenger information related to entries and exits of passengers at stations. This passenger information is inputted by, for example, passengers in advance. Alternatively, the passenger information is generated based on past information stored in a database.

As shown in FIG. 4, the passenger information according to the present embodiment includes a passenger ID for specifying each passenger, and an entry station, an entry time, an exit station and an exit time of each passenger. In addition, the passenger information is not limited to the information shown in FIG. 4, and may further include information such as a fare type (a general ticket, a commuter ticket, a commutation ticket and an IC card), a purchase section and a train code of an express ticket and an IC card number. Further, the passenger information may include one of entry times and exit times without including both of the entry times and the exit times.

Alternatively, the passenger information may be a table indicating an entry station and an entry time of passengers, and a rate of the number of passengers per exit station associated with the entry station and the entry time. In this case, the operation schedule evaluation apparatus 1 acquires the number of passengers on a platform by a sensor or a camera, and retrieves from the passenger information an entry station and an entry time associated with the station of the platform and an acquisition time of the number of passengers. Further, the operation schedule evaluation apparatus 1 can predict the number of passengers per exit station by specifying from the table the rate of the number of passengers associated with the retrieved entry station and entry time, and multiplying the specified rate and the acquired number of passengers. According to this configuration, even when normalcy is not maintained such as when a schedule is disturbed or when an event is held, it is possible to adequately predict the number of passengers per exit station.

The passenger flow calculator 11 shown in FIG. 1 creates passenger flow information related to a passenger flow (a flow of passengers) generated by train transportation based on operation schedule information stored in the operation schedule information DB 4 and passenger information stored in the passenger information DB 6. In this regard, the passenger flow calculator 11 calculates a required time which passengers spent based on the operation schedule information and the passenger information. Further, the passenger flow calculator 11 creates passenger flow information including a correspondence relationship between a passenger and a boarding train by allocating the passengers to the boarding train which the passengers get on, based on the required time. The passenger flow calculator 11 stores the created passenger flow information in the passenger flow information DB 7.

FIG. 5 is a view showing an example of passenger flow information stored in the passenger flow information DB 7. The passenger flow information according to the present embodiment includes passenger IDs for specifying passengers, train codes of boarding trains associated with the passengers, boarding sections (boarding stations and getting-off stations) and required times. Further, train codes of a plurality of trains and boarding sections are allocated to passengers who are estimated to go through a plurality of trains (i.e., transfer to another train) from entry stations to exit stations. In addition, the passenger flow information may further include a time required for a transfer.

The power consumption amount calculator 12 shown in FIG. 1 calculates a power consumption amount of each train per unit time (per predetermined time) based on the passenger flow information stored in the passenger flow information DB 7 (the passenger flow information created by the passenger flow calculator 11), the operation schedule information stored in the operation schedule information DB 4 and the car information stored in the car information DB 5. In addition, the power consumption amount obtained by way of calculation by the power consumption amount calculator 12 may be "a power consumption amount in a narrow sense" corresponding to the consumption power itself. Alternatively, the power consumption amount may be "a power consumption amount in a broad sense" obtained by calculating a sum of a positive value of the power consumption amount and a negative value of the regenerated power amount. In the following description, the power consumption amount calculator 12 calculates the power consumption amount in the broad sense (the power consumption amount of each train in the narrow sense per unit time and the regenerated power amount of each train per short time). Further, the power consumption amount in the broad sense will be simply abbreviated as the "power consumption amount" in some cases. The power consumption amount calculator 12 stores the calculated power consumption amount (the power consumption amount in the narrow sense and the regenerated power amount) in the power consumption amount information DB 8.

FIG. 6 is a view showing an example of power consumption amount information stored in the power consumption amount information DB 8. The power consumption amount information according to the present embodiment includes schedule IDs for specifying operation schedules, passenger flow IDs for specifying corresponding passenger flow information, train codes for specifying trains and power consumption amounts calculated by the power consumption amount calculator 12.

Figure 7:
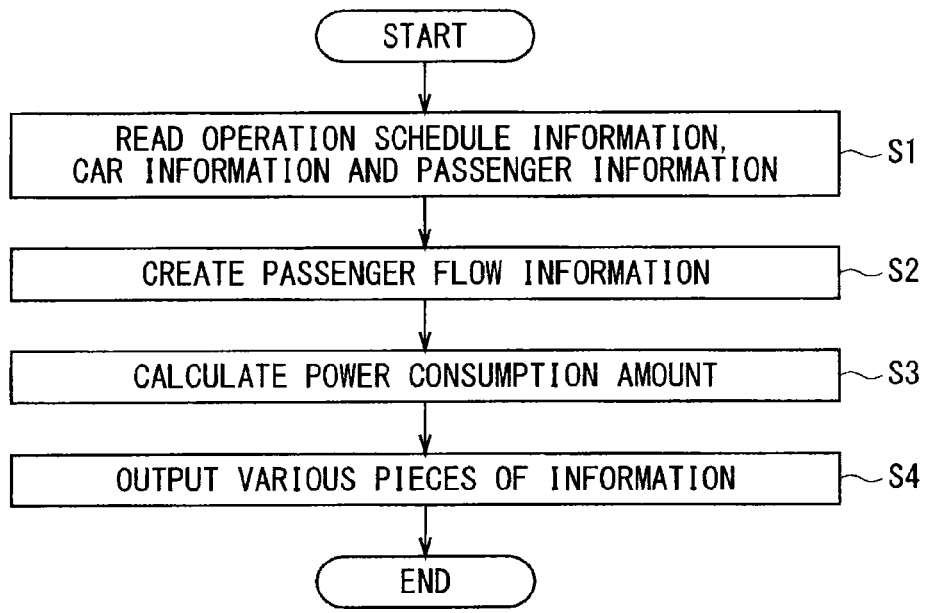
FIG. 7 is a flowchart showing an operation of the operation schedule processing system according to the first embodiment.

Next, an operation of the operation schedule processing system according to the present embodiment will be described. FIG. 7 is a flowchart showing an operation of the operation schedule processing system (operation schedule evaluation apparatus 1).

When the operation schedule evaluation apparatus 1 is activated, in step S1, the operation schedule evaluation apparatus 1 reads operation schedule information, car information and passenger information from the operation schedule information DB 4, the car information DB 5 and the passenger information DB 6, respectively.

In addition, when these pieces of information (operation schedule information, car information and passenger information) of each of a plurality of days (e.g. a day of a week or a special day such as the New Year's Day) is stored, the passenger flow calculator 11 may read various pieces of information related to a day specified by the operator through a user interface such as the input unit 2. Further, when the various pieces of information of a whole day do not need to be read, the passenger flow calculator 11 may read various pieces of information related to a time zone (e.g. a time zone from 10:00 to 17:00) specified by the operator through the user interface such as the input unit 2.

In step S2, the passenger flow calculator 11 creates passenger flow information based on the operation schedule information and the passenger information read in step S1. Hereinafter, an example of an operation of the passenger flow calculator 11 in step S2 will be described in detail with reference to FIG. 8.

First, in step S11, the passenger flow calculator 11 generates a plurality of boarding schedules for passengers described in passenger information, based on the operation schedule information. In this regard, the passenger flow calculator 11 generates for each passenger described in the passenger information a plurality of boarding schedules obtained by combining trains which satisfy conditions that trains arrive at and depart from an entry station after an entry time of the passenger and travel for an exit station.

In step S12, the passenger flow calculator 11 calculates for each of a plurality of generated boarding schedules a required time required when a train of a boarding schedule is used. For example, the passenger flow calculator 11 may calculate as a required time for each boarding schedule a time which a passenger spends until the passenger gets off a train at a getting-off station after getting on the train (arriving) at a boarding station. Alternatively, the passenger flow calculator 11 may calculate as a required time for each boarding schedule a time obtained by adding a moving time which a passenger spends until the passenger leaves a ticket gate from a platform, to a time which the passenger spends until the passenger gets off a train at a getting-off station after arriving at a boarding station. Further, the moving time may adopt a statistical value (e.g. a mean value) obtained from a distribution of moving times required to leave a ticket gate from a platform according to a size and a structure of a getting-off station.

In step S13, the passenger flow calculator 11 allocates, as a boarding train, a train of a boarding schedule whose required time calculated in step S12 is minimum to a passenger from among a plurality of boarding schedules generated in step S11. The passenger flow calculator 11 creates passenger flow information shown in FIG. 5 by performing the above operations in steps S11 to S14 with respect to each passenger described in passenger information.

Figure 8:
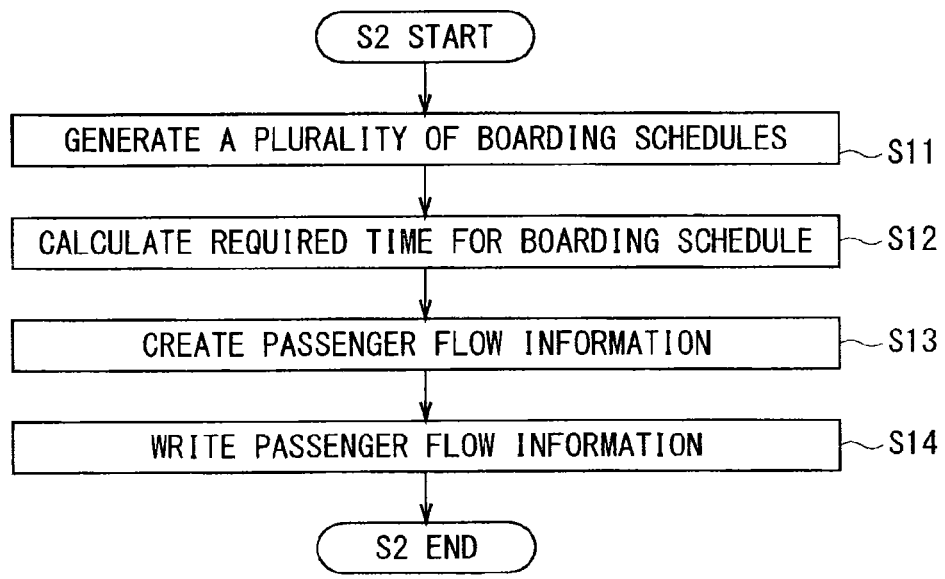
FIG. 8 is a flowchart showing an operation of a passenger flow calculator according to the first embodiment.

In step S14, the passenger flow calculator 11 writes the created passenger flow information in the passenger flow information DB 7. Subsequently, the operation shown in FIG. 8 is finished, and the step moves to step S3 shown in FIG. 7.

In step S3, the power consumption amount calculator 12 calculates a power consumption amount based on the operation schedule information and the car information read in step S1 and the passenger flow information created in step S2. Hereinafter, an example of an operation of the power consumption amount calculator 12 in step S3 will be described in detail with reference to FIG. 9.

First, in step S21, the power consumption amount calculator 12 calculates the number of passengers or a car occupancy of each train. For example, the power consumption amount calculator 12 calculates the number of passengers of each train based on passenger flow information. Alternatively, for example, the power consumption amount calculator 12 calculates the maximum number of passengers of a train based on the number of cars of a train included in the car information, and calculates the car occupancy of each train based on the number of passengers and the maximum number of passengers.

In step S22, the power consumption amount calculator 12 corrects car weight of each train based on the number of passengers or the car occupancy calculated in step S21. When, for example, calculating the number of passengers in step S21, the power consumption amount calculator 12 makes correction to add weight obtained by multiplying the number of passengers with average weight (e.g. 65 kg) to the car weight. Alternatively, when calculating the car occupancy in step S21, the power consumption amount calculator 12 makes correction to add weight corresponding to passengers corresponding to a range of the car occupancy (e.g. 10 tons per car for a train whose car occupancy is 80 to 120%) to car weight.

In step S23, the power consumption amount calculator 12 calculates a power consumption amount of each train based on the car weight of the train corrected in step S22 and the operation schedule information. For example, the power consumption amount calculator 12 calculates the power consumption amount in the narrow sense and the regenerated power amount by acquiring for the train whose car weight has been corrected, acceleration (deceleration) and a distance in which this acceleration (deceleration) has been carried out from the operation schedule information, and by multiplying the corrected car weight, the acceleration (deceleration) and the distance. The power consumption amount calculator 12 calculates power consumption amount information including a power consumption amount (the power consumption amount in the narrow sense and the regenerated power amount) shown in FIG. 6 by performing the above operations in steps S21 to S23 for each train.

In addition, calculation of the power consumption amount is not limited to the above. For example, the power consumption amount calculator 12 may calculate in advance the power consumption amount in the narrow sense and the regenerated power amount by multiplying uncorrected car weight, acceleration (deceleration) and a distance, and correct the power consumption amount in the narrow sense and the regenerated power amount calculated in advance, based on the above number of passengers or car occupancy. Further, when, for example, there is not a power running train near a train which is regenerating power, a regeneration loss power amount may be subtracted from the calculated regenerated power amount. That is, the power consumption amount calculator 12 may add an absolute value of the regeneration loss power amount corresponding to a car type and running conditions, to the power consumption amount in the broad sense, every time conditions of regeneration loss hold.

Figure 9:
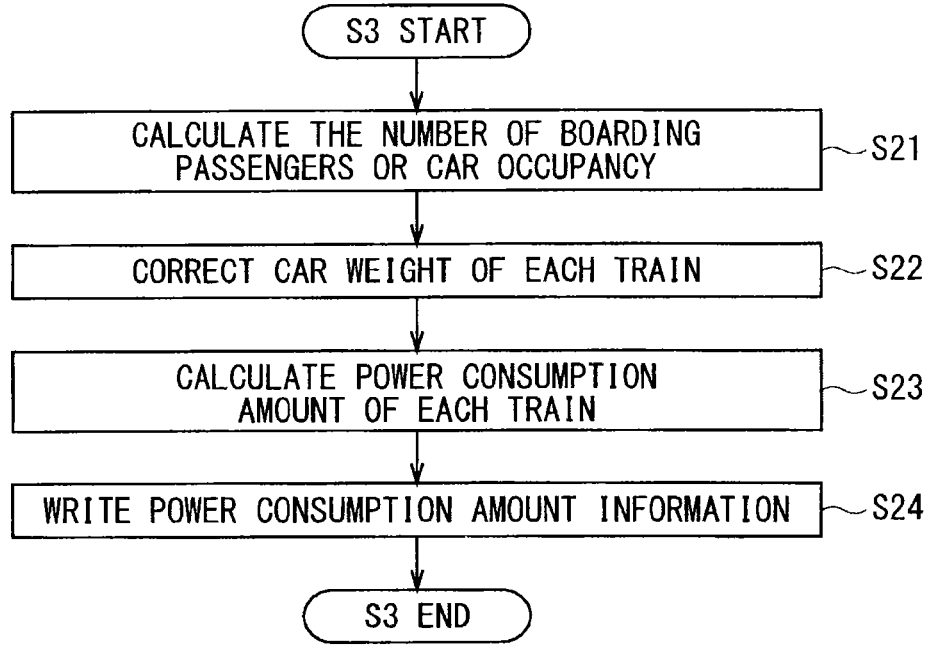
FIG. 9 is a flowchart showing an operation of a power consumption amount calculator according to the first embodiment.

In step S24, the power consumption amount calculator 12 writes the power consumption amount information calculated in step S23, in the power consumption amount information DB 8. Subsequently, the operation shown in FIG. 9 is finished, and the step moves to step S4 shown in FIG. 7.

In step S4, the operation schedule evaluation apparatus 1 outputs to the output unit 3, information including the operation schedule information, the car information and the passenger information read in step S1, the passenger flow information created in step S2 and the power consumption amount calculated in step S3. By this means, the information including the operation schedule information, the car information, the passenger information, the passenger flow information and the power consumption amount (the power consumption amount in the narrow sense and the regenerated power amount) is outputted by being displayed from the output unit 3. Further, the operation shown in FIG. 7 is finished.

The above operation schedule evaluation apparatus 1 and operation schedule processing system according to the present embodiment create passenger flow information based on operation schedule information and passenger information, and calculate a power consumption amount (the power consumption amount in the broad sense or in the narrow sense) by taking into account the passenger flow information. Consequently, it is possible to improve accuracy to calculate a power consumption amount compared to a method of calculating a power consumption amount without taking into account a passenger flow. Further, it is possible to comprehensively evaluate quality of operation schedules based on passenger flow information and an accurately calculated power consumption amount and, consequently, expect comprehensive optimization of passengers' convenience and a power consumption amount.

In addition, in the above description, the input unit 2 and the output unit 3 are provided outside the operation schedule evaluation apparatus 1. However, the input unit 2 and the output unit 3 are not limited to these, and may be provided inside the operation schedule evaluation apparatus 1, i.e., the operation schedule evaluation apparatus 1 may have the input unit 2 and the output unit 3.

Modified Example 1

In steps S11 to S14, a passenger flow calculator 11 according to the first embodiment calculates for each of a plurality of boarding schedules generated for each passenger, a required time required when a train of a boarding schedule is used, and allocates, as a boarding train, a train of a boarding schedule whose required time is minimum to a passenger.

However, the passenger flow calculator 11 is not limited to this. For example, the passenger flow calculator 11 may calculate for each of a plurality of boarding schedules generated for each passenger, the number of times of transfer required when a train of a boarding schedule is used, and allocate, as a boarding train, a train of a boarding schedule whose number of times of transfer is minimum to a passenger. Alternatively, the passenger flow calculator 11 may calculate for a plurality of boarding schedules generated for each passenger, a value obtained by applying weight to a required time and the number of times of transfer, and allocate, as a boarding train, a train of a boarding schedule whose value is minimum to a passenger.

Further, the passenger flow calculator 11 according to the first embodiment creates passenger flow information based on operation schedule information and passenger information in steps S11 to S14. However, the passenger flow calculator 11 is not limited to this. The passenger flow calculator 11 may create passenger flow information based on operation schedule information, passenger information and car information. More specifically, the passenger flow calculator 11 may calculate the degree of congestion in a car in addition to the above required time and number of times of transfer, and allocate, as a boarding train, a subsequent train to a passenger when the degree of congestion is high.

Modified Example 2

Figure 10:
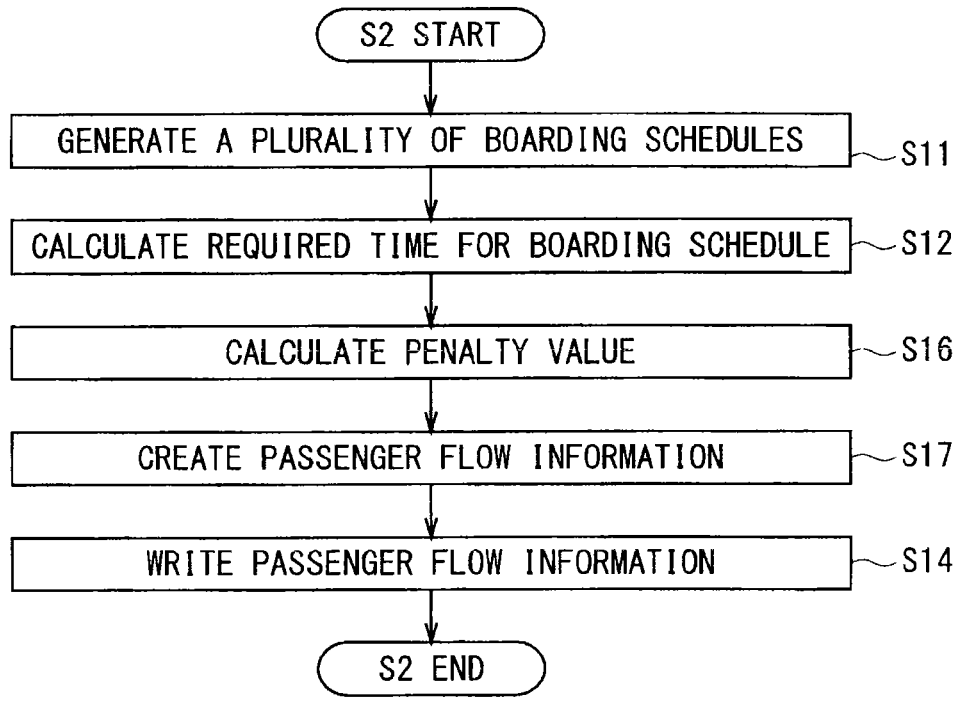
FIG. 10 is a flowchart showing an operation of a passenger flow calculator according to a second modified example of the first embodiment.

FIG. 10 is a flowchart showing an operation of a passenger flow calculator 11 according to the second modified example of the first embodiment. In this flowchart, steps S16 and S17 are added in place of step S13 in the flowchart shown in FIG. 8.

First, in step S16, the passenger flow calculator 11 according to the present modified example calculates a penalty value indicating an index of a penalty for lowering an evaluation of passengers' comfort and convenience based on operation schedule information and passenger information. For example, the passenger flow calculator 11 calculates, as a penalty value, a maximum car occupancy in a section in which each passenger gets on a train. Alternatively, the passenger flow calculator 11 calculates a penalty value based on the number of times of transfer and a car occupancy.

Further, in step S17, the passenger flow calculator 11 according to the present modified example allocates a train of one boarding schedule from among a plurality of boarding schedules generated in step S11 to a passenger, based on a required time calculated in step S12 (or the number of times of transfer described in the first modified example may be used) and the penalty value calculated in step S16. More specifically, the passenger flow calculator 11 converts the penalty value into a required time (e.g. converts a higher penalty value into a longer required time), and allocates, as a boarding train, a train of a boarding schedule whose sum of the converted required time and of the required time calculated in step S12 is minimum to a passenger. The passenger flow calculator 11 creates passenger flow information by performing the above operations in steps S16 to S17 with respect to each passenger described in passenger information. An operation schedule evaluation apparatus 1 according to the present modified example can comprehensively optimize passengers' convenience and a power consumption amount.

Second Embodiment

Figure 11:
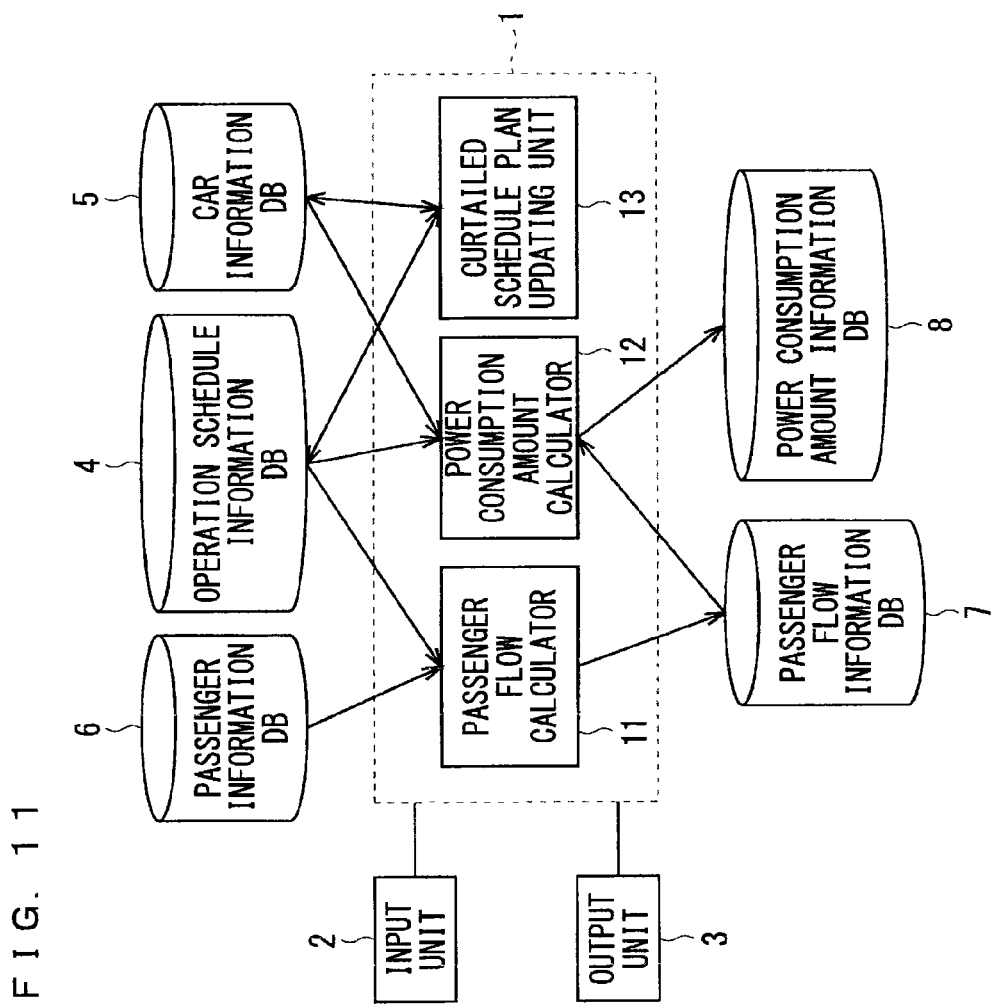
FIG. 11 is a block diagram showing a configuration of an operation schedule processing system according to a second embodiment.

FIG. 11 is a block diagram showing a configuration of an operation schedule processing system which has an operation schedule evaluation apparatus according to the second embodiment of the present invention. In addition, the same or similar components of the operation schedule processing system according to the present embodiment as those described in the first embodiment will be assigned the same reference numerals, and differences will be mainly described below.

As shown in FIG. 11, an operation schedule evaluation apparatus 1 according to the present embodiment employs a configuration in which a curtailed schedule plan updating unit 13 is added to components of the operation schedule evaluation apparatus 1 according to the first embodiment. Although this curtailed schedule plan updating unit 13 will be described in detail below, when an operator performs an operation (specification) of changing operation schedule information and car information through an input unit 2, this curtailed schedule plan updating unit 13 changes the operation schedule information and the car information in response to this changing operation, and stores the operation schedule information and the car information in the operation schedule information DB 4 and the car information DB 5.

Next, an operation of the operation schedule processing system according to the present embodiment will be described. FIG. 12 is a flowchart showing an operation of the operation schedule processing system according to the present embodiment. In steps S1 to S4 according to the present embodiment, the same operations as those in steps S1 to S4 described in the first embodiment are performed.

Main points will be described. In step S1, the operation schedule evaluation apparatus 1 reads operation schedule information, car information and passenger information. In step S2, a passenger flow calculator 11 creates passenger flow information based on the read operation schedule information and passenger information. In step S3, the power consumption amount calculator 12 calculates a power consumption amount based on the operation schedule information and the car information read in step S1 and the passenger flow information created in step S2. In step S4, the information including the operation schedule information, the car information, the passenger information, the passenger flow information and the power consumption amount is outputted by being displayed from an output unit 3.

Then, in step S31, the operator checks information outputted to the output unit 3, and adequately performs an operation (specification) of changing a displayed schedule plan (original operation schedule information and original car information) through the input unit 2. A change of operation schedule information is assumed to include train service suspension, section service suspension, reduction in a train, set of a train, integration/division of a train and a change of a departure time. The operator, for example, specifies service suspension in an entire section for a train code 253M and an operation with eight cars while an operation with twelve cars is scheduled for a train code 254M. The operator may specify a change of a car operation. For example, the operator specifies whether to suspend a service of a shuttle train of the train code 253M similar to the train code 253M or operate the shuttle train by allocating other available cars to the shuttle train.

The input unit 2 outputs the changing operation to the operation schedule evaluation apparatus 1 when receiving the changing operation from the operator. Further, in same step S31, the operation schedule evaluation apparatus 1 moves to step S32 when receiving the changing operation from the input unit 2 and moves to step S36 when not receiving the changing operation.

In step S32, the curtailed schedule plan updating unit 13 performs update processing of changing the original operation schedule information and the original car information according to the changing operation from the input unit 2, i.e., an operator's changing operation, and storing the changed operation schedule information and the changed car information in the operation schedule information DB 4 and the car information DB 5. Hereinafter, an example of an operation of the curtailed schedule plan updating unit 13 in step S32 will be described in detail with reference to FIG. 13.

First, in step S41, the curtailed schedule plan updating unit 13 receives a changing operation from the input unit 2.

In step S42, the curtailed schedule plan updating unit 13 changes the operation schedule information according to the received changing operation, and writes the changed operation schedule information in the operation schedule information DB 4. Further, the curtailed schedule plan updating unit 13 changes the car information according to the received changing operation, and writes the changed car information in the car information DB 5.

In addition, when a schedule of a given train is changed, the curtailed schedule plan updating unit 13 highlights and displays on the output unit 3 all trains which are scheduled to be operated using the same cars as those of the train, and inquires whether or not to change schedules of other trains, too. Generally, when a train is curtailed from an operation schedule, an influence of train service suspension/section service suspension, reduction in a train, set of a train, integration/division of a train and a change of a departure time on other trains needs to be taken into account at all times. However, it can be expected that, by highlighting and displaying in this way, it is possible to perform an operation of changing schedules while checking an influence on other trains.

Figure 13:
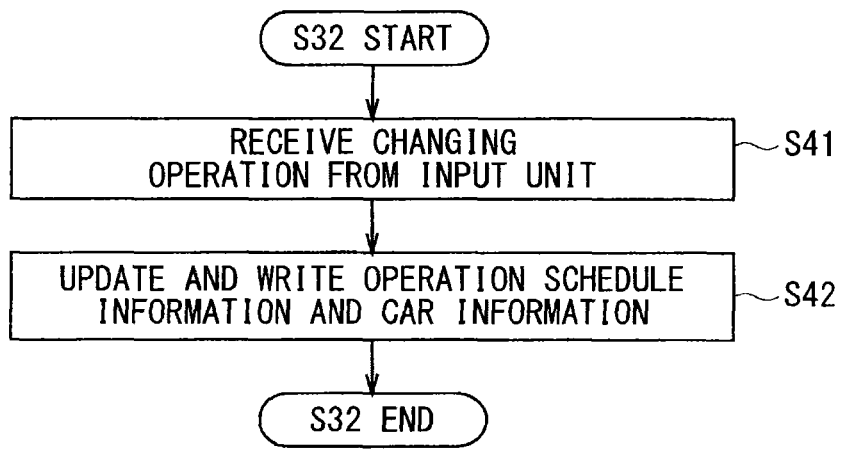
FIG. 13 is a flowchart showing an operation of a curtailed schedule plan updating unit according to the second embodiment.

The curtailed schedule plan updating unit 13 changes operation schedule information and car information, and then notifies that these pieces of information have been changed to the passenger flow calculator 11. Subsequently, the operation shown in FIG. 13 is finished, and the step moves to step S33 shown in FIG. 12.

In step S33, when receiving a change notification from the curtailed schedule plan updating unit 13, the passenger flow calculator 11 re-creates passenger flow information by performing the same operation as that in step S2 based on the operation schedule information and the passenger information changed by the curtailed schedule plan updating unit 13. Further, the passenger flow calculator 11 writes the re-created passenger flow information in a passenger flow information DB 7.

In step S34, the power consumption amount calculator 12 re-calculates a power consumption amount by performing the same operation as that in step S3 based on the passenger flow information created in step S33 and the car information changed by the curtailed schedule plan updating unit 13. Further, the power consumption amount calculator 12 writes the re-calculated power consumption amount in a power consumption amount information DB 8.

In step S35, similar to above step S4, information including the changed operation schedule information and car information, the passenger information, the passenger flow information and the power consumption amount is outputted by being displayed from the output unit 3.

In step S36, the operator checks the changed information outputted to the output unit 3, and adequately performs an operation of selecting whether or not to finish the changing operation, through the input unit 2. The input unit 2 outputs the selecting operation to the operation schedule evaluation apparatus 1 when receiving the selecting operation. Further, in same step S36, the operation schedule evaluation apparatus 1 finishes the operation shown in FIG. 11 when the received selecting operation is to finish the changing operation, and returns to step S31 when the received selecting operation is not to finish the changing operation.

The above operation schedule evaluation apparatus 1 and operation schedule processing system according to the present embodiment re-create passenger flow information and re-calculate a power consumption amount by using operation schedule information and car information changed by the curtailed schedule plan updating unit 13. Consequently, while adequately changing operation schedule information and car information, the operator can comprehensively evaluate a passenger flow change and a power consumption amount reduction effect based on the change. Consequently, the operator can easily create a curtailed schedule matching a purpose of preventing passengers' convenience from lowering or of adequately reducing a power consumption amount.

In addition, in the above description, the operation schedule evaluation apparatus 1 re-creates passenger flow information and re-calculates a power consumption amount when the curtailed schedule plan updating unit 13 changes both of operation schedule information and car information. However, the operation schedule evaluation apparatus 1 is not limited to this. The operation schedule evaluation apparatus 1 may re-create passenger flow information and re-calculate a power consumption amount when the curtailed schedule plan updating unit 13 changes at least one of operation schedule information and car information.

Third Embodiment

Figure 14:
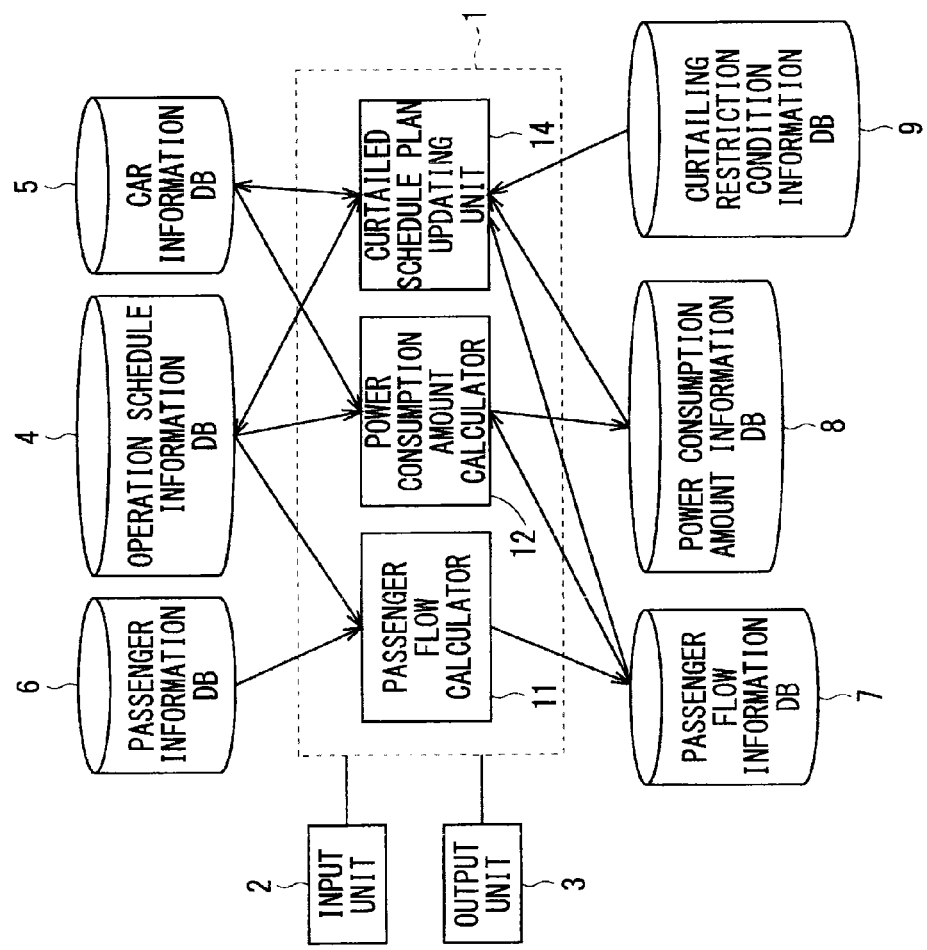
FIG. 14 is a block diagram showing a configuration of an operation schedule processing system according to a third embodiment.

FIG. 14 is a block diagram showing a configuration of an operation schedule processing system which has an operation schedule evaluation apparatus according to the third embodiment of the present invention. In addition, the same or similar components of the operation schedule processing system according to the present embodiment as those described in the first embodiment will be assigned the same reference numerals, and differences will be mainly described below.

As shown in FIG. 14, the operation schedule processing system according to the present embodiment employs a configuration in which a curtailing restriction condition information DB (database) 9 is added to components of the operation schedule processing system according to the first embodiment. Although the curtailing restriction condition information DB 9 will be described in detail below, the curtailing restriction condition information DB 9 stores curtailing restriction condition information (restriction condition information) set in advance, and an operation schedule evaluation apparatus 1 can communicate with (access) the curtailing restriction condition information DB 9.

Further, the operation schedule evaluation apparatus 1 according to the present embodiment employs a configuration in which a curtailed schedule plan creating unit 14 is added to components of the operation schedule evaluation apparatus 1 according to the first embodiment. Although the curtailed schedule plan creating unit 14 will be described in detail below, this curtailed schedule plan creating unit 14 creates new operation schedule information and new car information based on operation schedule information stored in an operation schedule information DB 4, car information stored in a car information DB 5, passenger flow information created by a passenger flow calculator 11, a power consumption amount calculated by a power consumption amount calculator 12 and curtailing restriction condition information stored in the curtailing restriction condition information DB 9. Further, the curtailed schedule plan creating unit 14 stores the new operation schedule information and the new car information in the operation schedule information DB 4 and the car information DB 5.

FIG. 15 is a view showing an example of curtailing restriction condition information stored in the curtailing restriction condition information DB 9. The curtailing restriction condition information includes per schedule pattern a reduction time zone, a target power amount, an allowable car occupancy, a priority item upon selection of a curtailing train and settings as to whether or not to allow use of a curtailing method (settings as to whether or not to allow use of a curtailed operation such as train service suspension and partial train service suspension, a change of a train set, integration/division and a change of a time interval). Each information included in the curtailing restriction condition information will be described in detail below.

When a value is not set to an allowable car occupancy as in a pattern A, a car occupancy is allowed to limitlessly deteriorate. When a value is not set to a target power amount as in a pattern D, a schedule pattern is allowed to be created without taking into account a power consumption amount.

The priority item upon selection of a curtailing train sets (specifies) which one of a passenger flow of passenger flow information and a power consumption amount is focused to select a curtailing target. That is, in the present embodiment, the curtailing restriction condition information includes settings of prioritizing one of the passenger flow of the passenger flow information and the power consumption amount over the other. As described below, when prioritizing the power consumption amount over the passenger flow is set, an operation of curtailing from an operation schedule a train whose power consumption amount is relatively high is performed. When prioritizing the passenger flow over the power consumption amount is set, an operation of curtailing from an operation schedule a train whose influence on the passenger flow is little (e.g. the car occupancy is low or passengers' convenience is low) is performed.

According to whether or not to allow use of the curtailing method, i.e., a schedule change rule, whether or not to use the curtailing method for each item is set (specified). In this regard, an example where the curtailing method for items to which "1" is inputted can be used and the curtailing method for items to which "0" is inputted cannot be used is described here.

In addition, setting modes of each value and item names of the above-described curtailing restriction condition information are only exemplary and are not limited to these. For example, the curtailing restriction condition information may include specifying whether or not to allow creation of an operation schedule which does not achieve a target value, specifying a curtailing section or specifying a train which cannot be curtailed. Further, a mode of setting a plurality of curtailing sections and setting the same curtailing restriction condition as the above per section may be adopted. Furthermore, the curtailing restriction condition information DB 9 may be configured to store in advance a plurality of restriction condition patterns which is applicable as curtailing restriction condition information, and specify whether or not to apply each restriction condition pattern every time the curtailed schedule plan creating unit 14 is activated. Alternatively, an input unit 2 may receive an input of a restriction condition pattern every time the curtailed schedule plan creating unit 14 is activated, and the curtailing restriction condition information DB 9 may store the inputted restriction condition pattern. Further, an output unit 3 may display contents of the curtailing restriction condition information DB 9 before the curtailed schedule plan creating unit 14 is activated, and the restriction condition pattern may be changed, created and deleted through the input unit 2.

Figure 16:
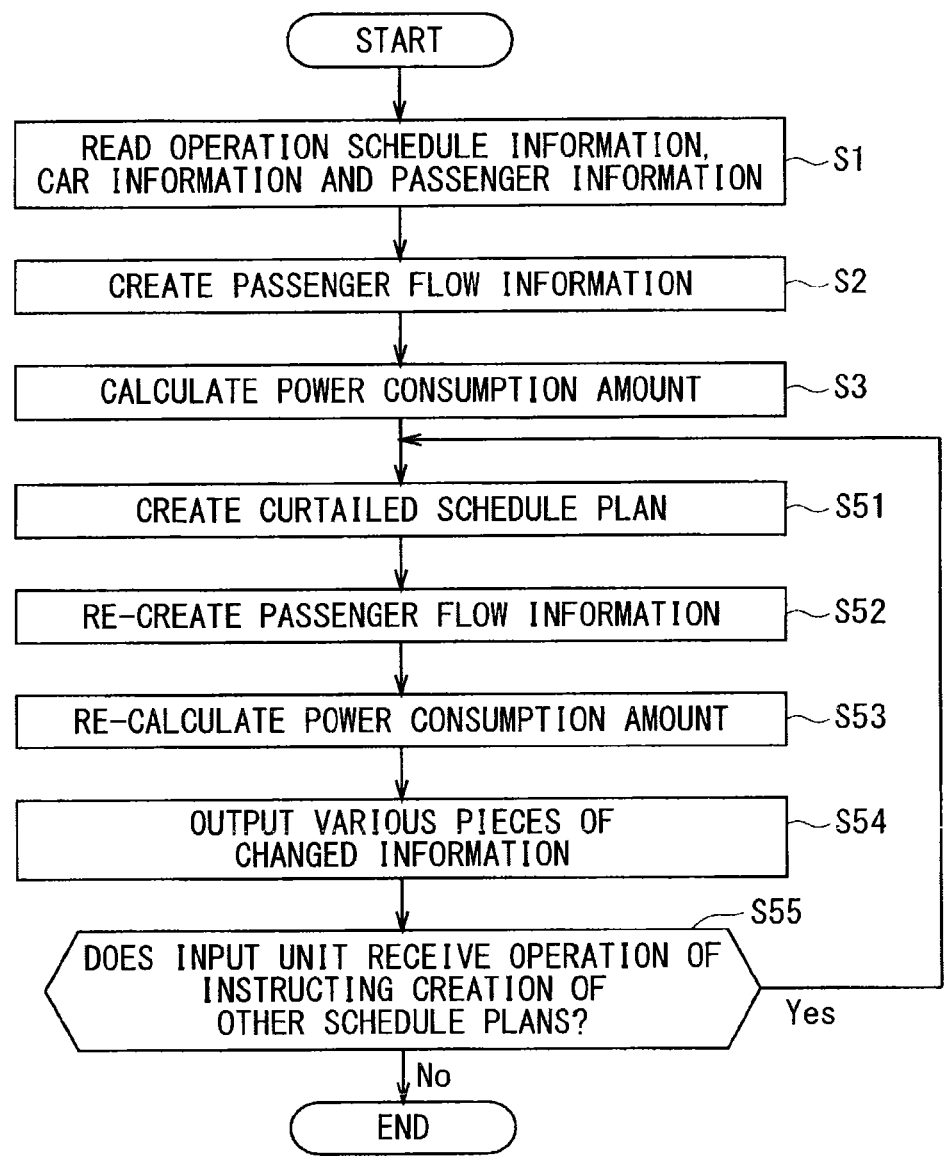
FIG. 16 is a flowchart showing an operation of the operation schedule processing system according to the third embodiment.

Next, an operation of the operation schedule processing system according to the present embodiment will be described. FIG. 16 is a flowchart showing an operation of the operation schedule processing system according to the present embodiment. In steps S1 to S3 according to the present embodiment, the same operations as those in steps S1 to S3 described in the first embodiment are performed.

Only main points will be described. In step S1, the operation schedule evaluation apparatus 1 reads operation schedule information, car information and passenger information. In step S2, a passenger flow calculator 11 creates passenger flow information based on the read operation schedule information and passenger information. In step S3, the power consumption amount calculator 12 calculates a power consumption amount based on the operation schedule information and the car information read in step S1 and the passenger flow information created in step S2.

Subsequently, in step S51, the curtailed schedule plan creating unit 14 creates a curtailed schedule plan (new operation schedule information and new car information) based on the operation schedule information and the car information read in step S1 and the passenger flow information, the power consumption amount and the curtailing restriction condition information read in same step S51. Hereinafter, an example of an operation of the curtailed schedule plan creating unit 14 in step S51 will be described in detail with reference to FIG. 17.

First, in step S61, the curtailed schedule plan creating unit 14 reads the passenger flow information created in step S2 and the power consumption amount calculated in step S3 from a passenger flow information DB 7 and a power consumption amount information DB 8, respectively.

In step S62, the curtailed schedule plan creating unit 14 reads the curtailing restriction condition information from the curtailing restriction condition information DB 9.

In step S63, the curtailed schedule plan creating unit 14 creates a curtailed schedule plan (new operation schedule information and new car information) based on the operation schedule information and the car information read in step S1, the passenger flow information and the power consumption amount read in step S61 and the curtailing restriction condition information read in same step S62.

As an example of a operation, in step S63, the curtailed schedule plan creating unit 14 creates a curtailed schedule plan based on a pattern A (curtailing restriction condition information) shown in FIG. 15 will be described below. The pattern A sets (specifies) that a time zone in which a power consumption amount needs to be reduced is from 10 o'clock to 16 o'clock, a target reduction power amount is 15% of reduction or more with respect to the original operation schedule, an allowable car occupancy is limitless, a power consumption amount is prioritized over a passenger flow, a curtailed operation is allowed, a change of a train set is allowed, integration/division is allowed and a change of a time interval is allowed.

First, the curtailed schedule plan creating unit 14 selects one train whose power consumption amount is high (e.g. higher than a threshold set in advance) as a curtailing candidate since prioritizing a power consumption amount over a passenger flow is set in the priority item upon selection of a curtailing train. Causes that a power consumption amount of a train increases include a cause that old cars whose power consumption amounts are high upon running without passengers are used, and, in addition, causes that a car occupancy is high, a train set length is long and power regeneration efficiency is poor. The present embodiment has been described assuming that the curtailed schedule plan creating unit 14 preferentially selects a train whose power consumption amount is high irrespectively of the causes. However, for example, a train selection priority corresponding to the above causes may be set to the curtailing restriction condition information DB 9, and the curtailed schedule plan creating unit 14 may select a train according to the train selection priority.

Next, the curtailed schedule plan creating unit 14 applies a train related to the selected train as a curtailing candidate. For example, as curtailing candidates, preceding and subsequent trains which connect with a selected train, a train which is operated using the same car bodies as those of the selected train and a train matching a car occupancy or a power consumption amount among a car group for which it is determined that car operations can be changed at a starting station, a terminal station or a shuttle station may be applied. Thus, the curtailed schedule plan creating unit 14 acquires one or a plurality of trains as curtailing candidates.

Then, the curtailed schedule plan creating unit 14 briefly calculates a power consumption amount which can be reduced by curtailing candidate trains from an operation schedule. In this regard, the curtailed schedule plan creating unit 14 acquires power consumption amounts of curtailing candidate trains from the power consumption amount information DB 8. When there is a plurality of curtailing candidate trains, the curtailed schedule plan creating unit 14 acquires the power consumption amounts of these trains from the power consumption amount information DB 8, and calculates a sum of these power consumption amounts.

Subsequently, the curtailed schedule plan creating unit 14 determines whether or not the briefly calculated power consumption amount reaches 15% which is a target reduction power amount with respect to the consumption amount before curtailing. The curtailed schedule plan creating unit 14 sequentially selects curtailing candidate trains until the curtailed schedule plan creating unit 14 determines that the briefly calculated power consumption amount reaches the target reduction power amount. When determining that the briefly calculated power consumption amount reaches the target reduction power amount, the curtailed schedule plan creating unit 14 creates a curtailed schedule plan (new operation schedule information and new car information) obtained by curtailing the curtailing candidate trains from the original operation schedule, and finishes the operation in step S63.

In addition, according to the pattern A, it is also assumed that a combination of curtailing candidate trains whose briefly calculated power consumption amounts can reach a target reduction power amount cannot be found depending on an allowable car occupancy and a passenger flow. In this case, curtailing candidate trains are selected such that, even when the car occupancies in part of trains exceed allowable car occupancies, the consumption power amount achieves the target reduction power amount.

Next, an example where the curtailed schedule plan creating unit 14 creates a curtailed schedule plan based on a pattern B (curtailing restriction condition information) shown in FIG. 15 will be described below as another operation example of step S63. The pattern B sets (specifies) that a time zone in which a power consumption amount needs to be reduced is from 10 o'clock to 16 o'clock, a target reduction power amount is set to 15% of reduction or more with respect to the original operation schedule, an allowable car occupancy is set 150% or less, a passenger flow is prioritized over a power consumption amount, a curtailed operation is allowed, a change of a train set is allowed, integration/division is allowed and a change of a time interval is allowed.

First, the curtailed schedule plan creating unit 14 selects one train whose car occupancy is low (e.g. lower than a threshold set in advance) as a curtailing candidate since prioritizing a passenger flow over a power consumption amount is set in the priority item upon selection of a curtailing train.

Further, the curtailed schedule plan creating unit 14 briefly studies on a method of curtailing selected trains. When, for example, the selected trains are curtailed, the curtailed schedule plan creating unit 14 re-calculates a car occupancy of a subsequent train assuming that all passengers who are about to get on the curtailed train get on the subsequent train. When the car occupancy of the subsequent train exceeds 150% which is the allowable car occupancy, the curtailed schedule plan creating unit 14 determines that a curtailed operation is inadequate as the train curtailing method and studies on reduction in a train set. Alternatively, the curtailed schedule plan creating unit 14 studies on adjustment of an operation interval such that the car occupancy of the subsequent train does not exceed the allowable car occupancy.

Meanwhile, when the car occupancy of the subsequent train does not exceed 150% which is the allowable car occupancy, the curtailed schedule plan creating unit 14 applies trains related to the selected trains as curtailing candidates similar to the above example.

Then, similar to the above example, the curtailed schedule plan creating unit 14 briefly calculates a power consumption amount which can be reduced by curtailing curtailing candidate trains from an operation schedule. Subsequently, similar to the above example, the curtailed schedule plan creating unit 14 determines whether or not the briefly calculated power consumption amount reaches 15% which is a target reduction power amount with respect to the consumption amount before curtailing. The curtailed schedule plan creating unit 14 sequentially selects curtailing candidate trains until the curtailed schedule plan creating unit 14 determines that the briefly calculated power consumption amount reaches the target reduction power amount. When determining that the briefly calculated power consumption amount reaches the target reduction power amount, the curtailed schedule plan creating unit 14 creates a curtailed schedule plan (new operation schedule information and new car information) obtained by curtailing the curtailing candidate trains from the original operation schedule, and finishes the operation in step S63.

In addition, according to the pattern B, it is also assumed that a combination of curtailing candidate trains whose briefly calculated power consumption amounts can reach a target reduction power amount cannot be found depending on an allowable car occupancy and a passenger flow. In this case, a train whose briefly calculated power consumption amount does not reach the reduction power amount yet is maximum may be selected as a curtailing candidate.

Figure 17:
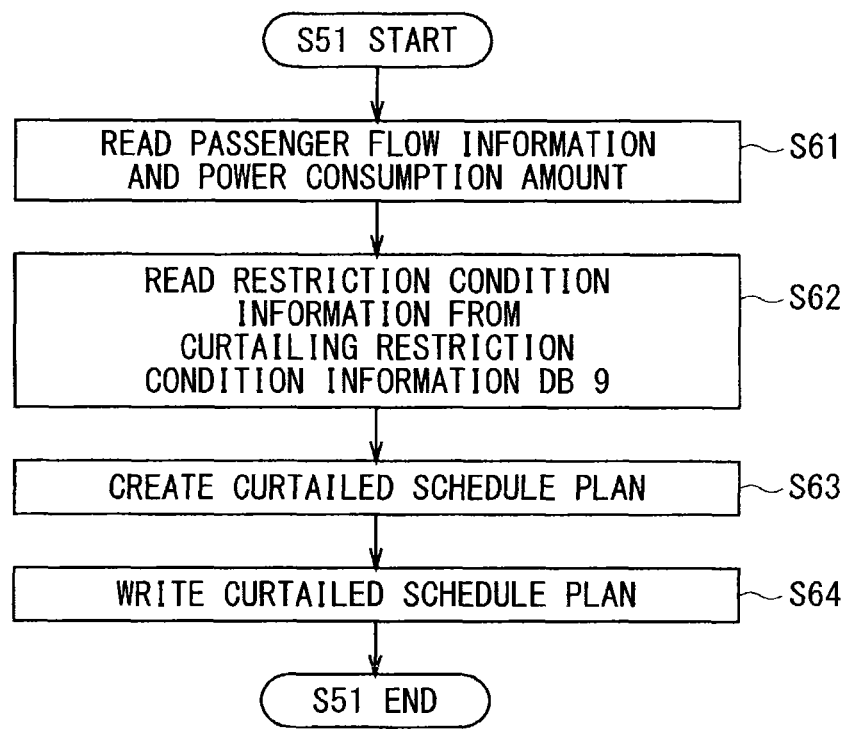
FIG. 17 is a flowchart showing an operation of a curtailed schedule plan creating unit according to the third embodiment.

In step S64, the curtailed schedule plan creating unit 14 writes (stores) the created curtailed schedule plan, i.e., new operation schedule information and new car information in the operation schedule information DB 4 and the car information DB 5, respectively. Subsequently, the operation shown in FIG. 17 is finished, and the step moves to step S52 shown in FIG. 16.

In step S52, the passenger flow calculator 11 re-creates passenger flow information by performing the same operation as that in step S2 based on the new operation schedule information and passenger information created in step S51. Further, the passenger flow calculator 11 writes the re-created passenger flow information in a passenger flow information DB 7.

In step S53, the power consumption amount calculator 12 re-calculates a power consumption amount by performing the same operation as that in step S3 based on the passenger flow information created in step S52 and the new car information created in step 51. Further, the power consumption amount calculator 12 writes the re-calculated power consumption amount in a power consumption amount information DB 8.

In step S54, the operation schedule evaluation apparatus 1 outputs to the output unit 3 information including the passenger information read in step S1, the new operation schedule information and the new car information created in step S51, the passenger flow information created in step S52 and the power consumption amount calculated in step S53. By this means, the information including the new operation schedule information, the new car information, the passenger information, the passenger flow information and the power consumption amount is outputted by being displayed from an output unit 3.

In step S55, the operator checks information displayed on the output unit 3, and adequately gives an instruction operation of creating another curtailed schedule plan different from the displayed schedule plan (the new operation schedule information and the new car information created in step S51) through the input unit 2. The input unit 2 outputs the instruction operation to the operation schedule evaluation apparatus 1 when receiving the instruction operation from the operator.

Further, in same step S55, when receiving the instruction operation from the input unit 2, the operation schedule evaluation apparatus 1 returns to step S51, and creates a curtailed schedule plan different from the curtailed schedule plan created in previous step S51 by using the original operation schedule (the operation schedule information and the car information read in step S1). Meanwhile, in same step S55, the operation schedule evaluation apparatus 1 finishes the operation shown in FIG. 16 when not receiving the instruction operation from the input unit 2.

The above operation schedule evaluation apparatus 1 and operation schedule processing system according to the present embodiment can automatically create a curtailed schedule plan. Consequently, it is possible to reduce an operation amount of the operator and reduce a time for creating a curtailed schedule. Further, it is possible to compare curtailed schedule plans by providing a plurality of curtailing restriction conditions or automatically creating a plurality of different curtailed schedule plan candidates even under the same curtailed restriction condition. Consequently, the operator can cause the operation schedule evaluation apparatus and the operation schedule processing system to create an adequate curtailed schedule plan matching a purpose.

In addition, in the above description, the operation schedule evaluation apparatus 1 re-creates passenger flow information and re-calculates a power consumption amount when the curtailed schedule plan creating unit 14 creates both of operation schedule information and car information. However, the operation schedule evaluation apparatus 1 is not limited to this. The operation schedule evaluation apparatus 1 may re-create passenger flow information and re-calculate a power consumption amount when the curtailed schedule plan creating unit 14 creates at least one of operation schedule information and car information.

Fourth Embodiment

Figure 18:
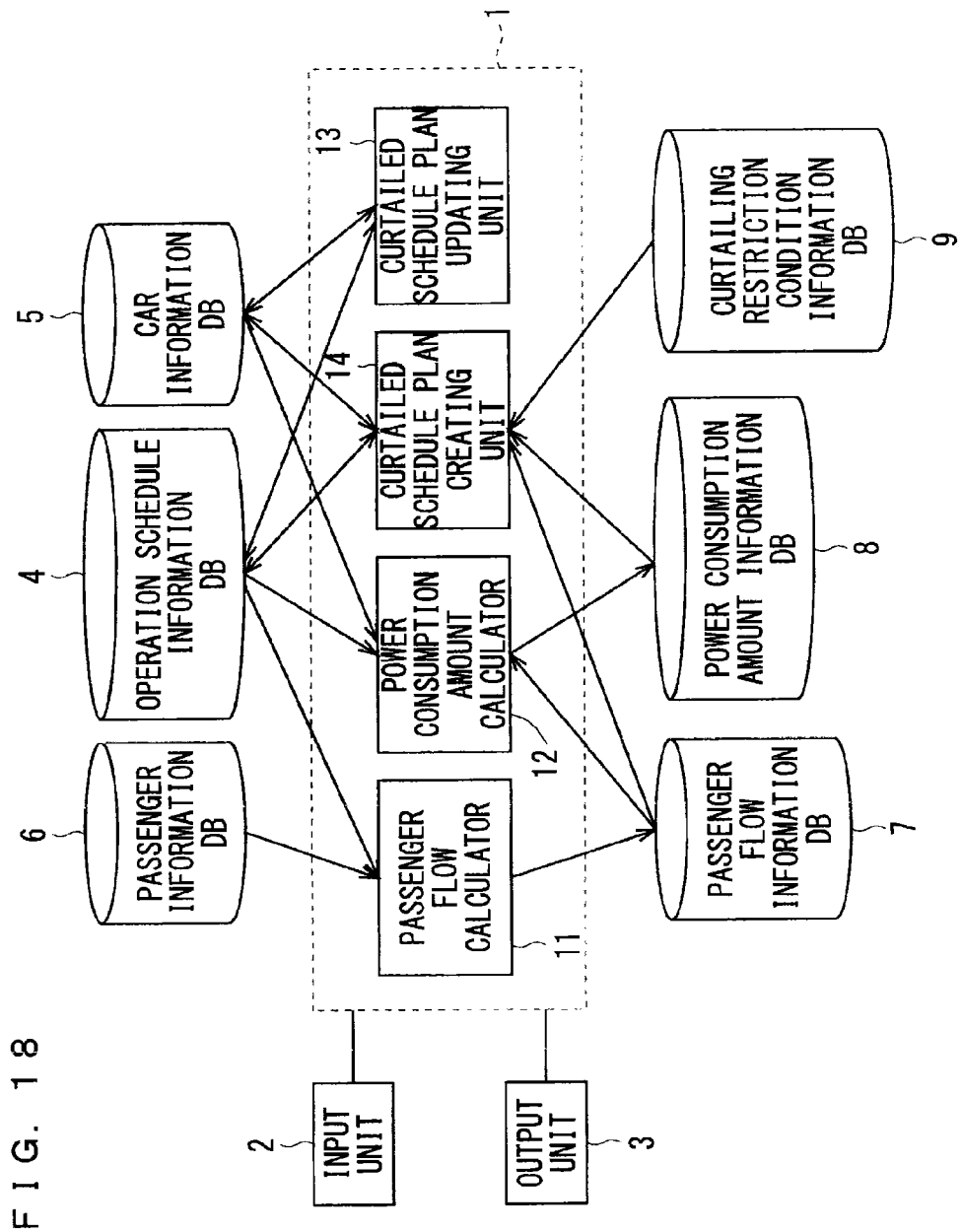
FIG. 18 is a block diagram showing a configuration of an operation schedule processing system according to a fourth embodiment.

FIG. 18 is a block diagram showing a configuration of an operation schedule processing system which has an operation schedule evaluation apparatus according to the fourth embodiment of the present invention. In addition, the same or similar components of the operation schedule processing system according to the present embodiment as those described in the first to third embodiments will be assigned the same reference numerals, and differences will be mainly described below.

As shown in FIG. 18, the operation schedule processing system according to the present embodiment employs a configuration in which a curtailed schedule plan updating unit 13 according to the second embodiment and a curtailing restriction condition information DB 9 and a curtailed schedule plan creating unit 14 according to the third embodiment are added to components of the operation schedule processing system according to the first embodiment. Hence, the operation schedule processing system according to the present embodiment can perform operations of both of the operation schedule processing systems according to the second embodiment and the third embodiment.

Figure 19:
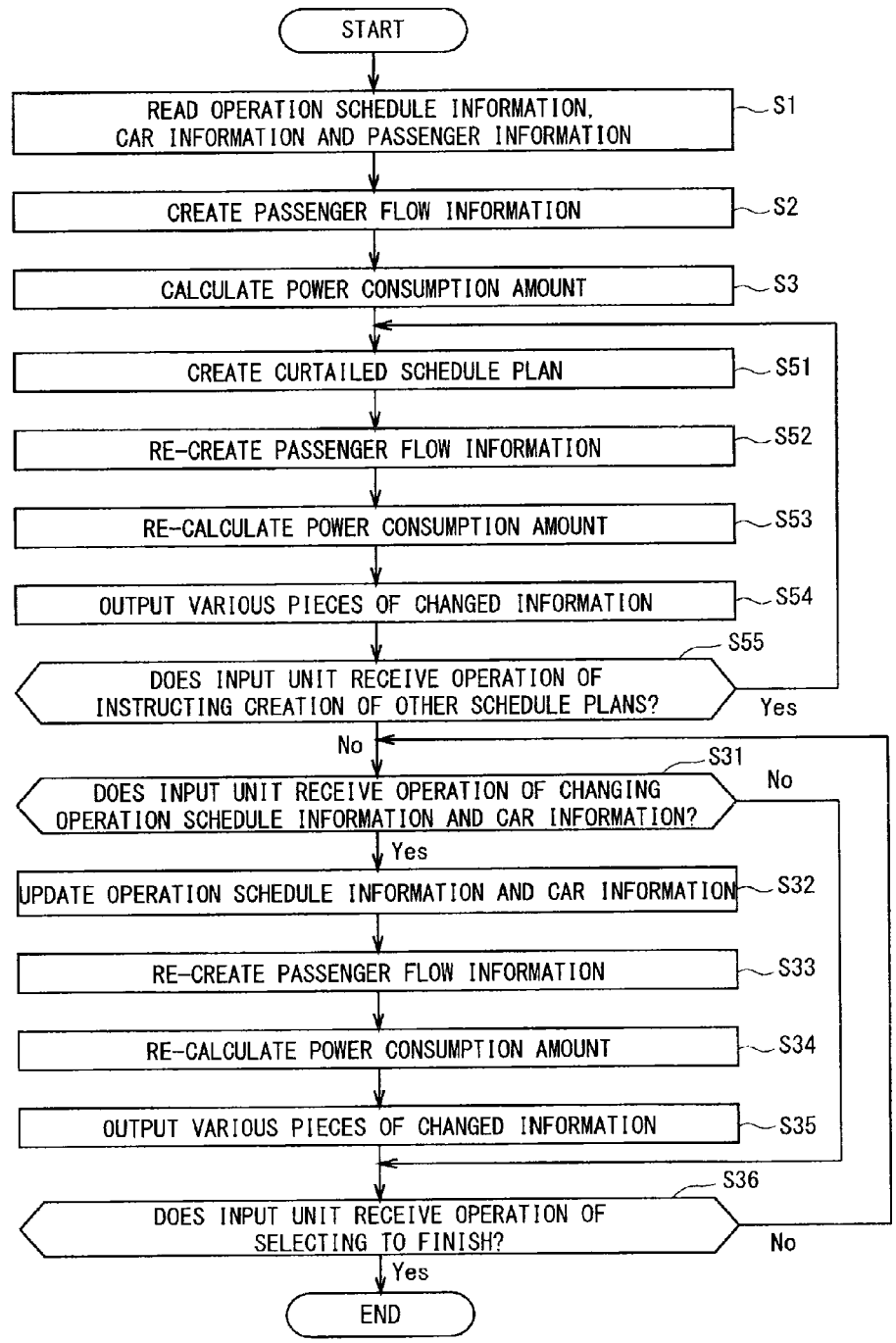
FIG. 19 is a flowchart showing an operation of the operation schedule processing system according to the fourth embodiment.

Next, an operation of the operation schedule processing system according to the present embodiment will be described. FIG. 19 is a flowchart showing an operation of the operation schedule processing system according to the present embodiment. In steps S1 to S3, steps S51 to S55 and steps S31 to S36 according to the present embodiment, respectively, the same operations as those in steps S1 to S3 described in the first embodiment, steps S51 to S55 described in the third embodiment and steps S31 to S36 described in the second embodiment are performed.

Only main points will be described. In step S1, the operation schedule evaluation apparatus 1 reads operation schedule information, car information and passenger information. In step S2, a passenger flow calculator 11 creates passenger flow information based on the read operation schedule information and passenger information. In step S3, the power consumption amount calculator 12 calculates a power consumption amount based on the operation schedule information and the car information read in step S1 and the passenger flow information created in step S2.

Then, in step S51, the curtailed schedule plan creating unit 14 creates a curtailed schedule plan (new operation schedule information and new car information) based on the operation schedule information and the car information read in step S1 and the passenger flow information, the power consumption amount and the curtailing restriction condition information read in same step S51.

In step S52, the passenger flow calculator 11 re-creates passenger flow information by performing the same operation as that in step S2 based on the new operation schedule information and passenger information created in step S51. Further, the passenger flow calculator 11 writes the re-created passenger flow information in a passenger flow information DB 7.

In step S53, the power consumption amount calculator 12 re-calculates a power consumption amount by performing the same operation as that in step S3 based on the passenger flow information created in step S52 and the new car information created in step 51. Further, the power consumption amount calculator 12 writes the re-calculated power consumption amount in a power consumption amount information DB 8.

In step S54, the information including the new operation schedule information, the new car information, the passenger information, the passenger flow information and the power consumption amount is outputted by being displayed from an output unit 3.

In step S55, the operator checks information displayed on the output unit 3, and adequately gives an instruction operation of creating another curtailed schedule plan different from the displayed schedule plan (the new operation schedule information and the new car information created in step S51) through the input unit 2. When receiving the instruction operation from an operator, the operation schedule evaluation apparatus 1 returns to step S51, and creates a curtailed schedule plan different from the curtailed schedule plan created in previous step S51 by using the original operation schedule (the operation schedule information and the car information read in step S1). Meanwhile, in same step S55, the operation schedule evaluation apparatus 1 moves to step S31 when not receiving the instruction operation from the operator.

Then, in step S31, the operator checks information outputted to the output unit 3, and adequately performs an operation (specification) of changing a displayed schedule plan (the new operation schedule information and the new car information created in step S51) through the input unit 2. The operation schedule evaluation apparatus moves to step S32 when receiving the changing operation from the operator and moves to step S36 when not receiving the changing operation.

In step S32, the curtailed schedule plan updating unit 13 performs update processing of changing the above new operation schedule information and new car information according to the changing operation received by the input unit 2, i.e., an operator's changing operation, and storing the new operation schedule information and the new car information in an operation schedule information DB 4 and a car information DB 5. In addition, the curtailed schedule plan updating unit 13 changes operation schedule information and car information, and then notifies that these pieces of information have been changed, to a passenger flow calculator 11.

In step S33, when receiving a change notification from the curtailed schedule plan updating unit 13, the passenger flow calculator 11 re-creates passenger flow information by performing the same operation as that in step S2 based on the operation schedule information and the passenger information changed by the curtailed schedule plan updating unit 13. Further, the passenger flow calculator 11 writes the re-created passenger flow information in a passenger flow information DB 7.

In step S34, the power consumption amount calculator 12 re-calculates a power consumption amount by performing the same operation as that in step S3 based on the passenger flow information created in step S33 and the car information changed by the curtailed schedule plan updating unit 13. Further, the power consumption amount calculator 12 writes the re-calculated power consumption amount in a power consumption amount information DB 8.

In step S35, similar to above step S54, information including the changed operation schedule information and car information, the passenger information, the passenger flow information and the power consumption amount is outputted by being displayed from the output unit 3.

In step S36, the operator checks the changed information outputted to the output unit 3, and adequately performs an operation of selecting whether or not to finish the changing operation, through the input unit 2. Further, the operation schedule evaluation apparatus 1 finishes the operation shown in FIG. 19 when the received selecting operation is to finish the changing operation, and returns to step S31 when the received selecting operation is not to finish the changing operation.

The above operation schedule evaluation apparatus 1 and operation schedule processing system according to the present embodiment can provide the same effect as those obtained in the second embodiment and the third embodiment. Further, the operator can perform an operation of updating automatically created curtailed schedule plans. Consequently, it is possible to reduce an operation amount of the operator and easily create curtailed schedules which reflect an operator's intention. That is, a curtailed schedule plan presented to the operator includes an optimized or evaluated passenger flow and power consumption amount at all times. Consequently, it is possible to efficiently create a curtailed schedule plan which can achieve a passenger flow and a power consumption amount which the operator expects.

Fifth Embodiment

Figure 20:
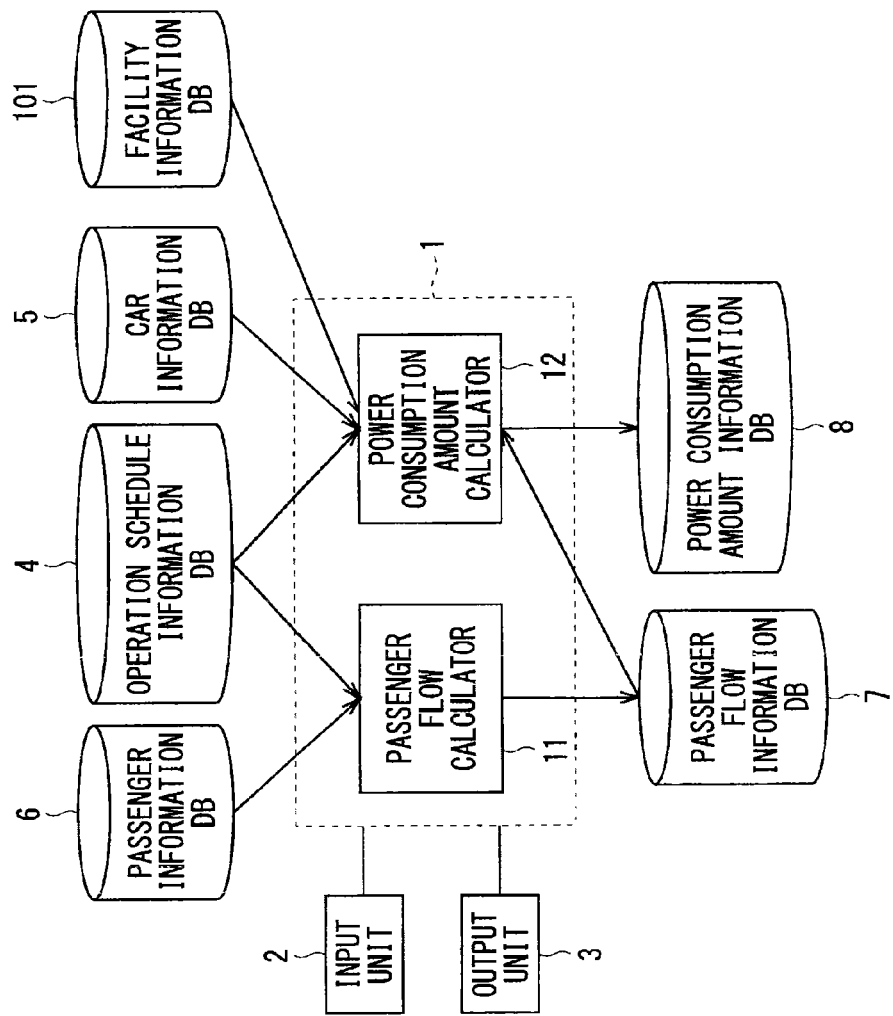
FIG. 20 is a block diagram showing a configuration of an operation schedule processing system according to a fifth embodiment.

FIG. 20 is a block diagram showing a configuration of an operation schedule processing system which has an operation schedule evaluation apparatus according to the fifth embodiment of the present invention. In addition, the same or similar components of the operation schedule processing system according to the present embodiment as those described in the first to fourth embodiments will be assigned the same reference numerals, and differences will be mainly described below.

As shown in FIG. 20, the operation schedule processing system according to the present embodiment employs a configuration in which a facility information DB (database) 101 is added to components of the operation schedule processing system according to the first embodiment.

The facility information DB 101 stores facility information related to facilities which effectively utilize regeneration loss power. The facilities which effectively utilize regeneration loss power (referred to as "power utilization facilities" below) include, for example, a battery, a station building auxiliary power source device and a feeding optimal control system which adequately controls feeding (power supply). As shown in FIG. 21, for example, the facility information includes a facility type name, an installation place, a rated output or a rated capacity, a sustainable output time, a standby time, a threshold voltage, a reference voltage and a manufacturing date of the power utilization facility. In addition, the facility information is not limited to the facility information shown in FIG. 21, and may not include a reference voltage and a manufacturing date and may include item contents other than the reference voltage and the manufacturing date.

Figure 22:
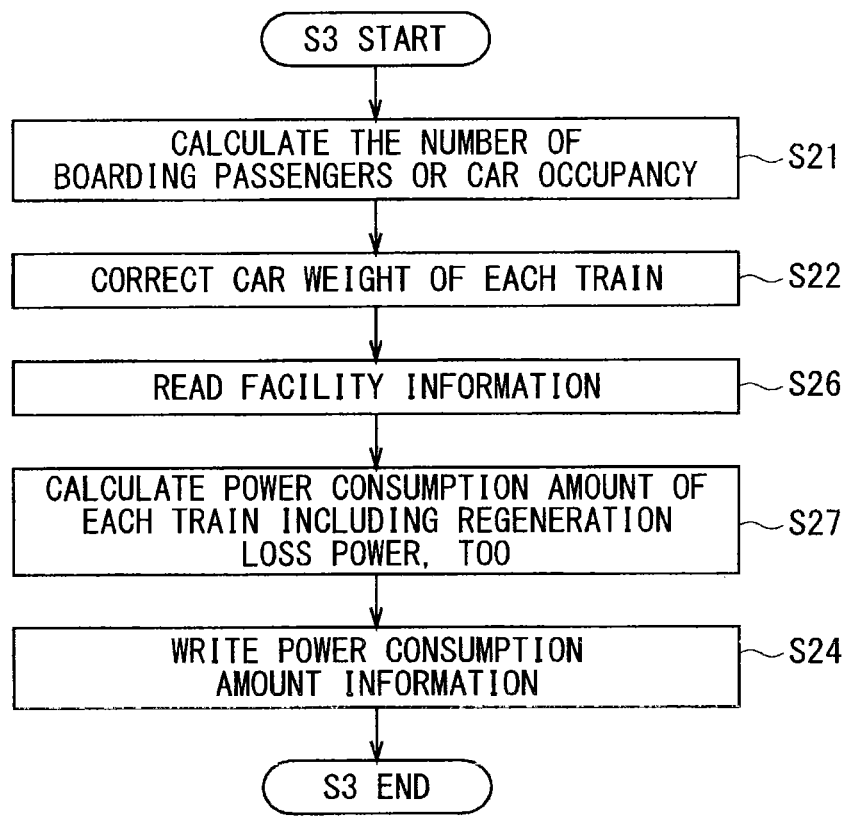
FIG. 22 is a flowchart showing an operation of a power consumption amount calculator according to the fifth embodiment.

Next, an operation of the operation schedule processing system according to the present embodiment will be described. FIG. 22 is a flowchart showing an operation of step S3 of a power consumption amount calculator 12 included in the operation schedule processing system (operation schedule evaluation apparatus 1) according to the present embodiment. In addition, in steps S1 to S2 according to the present embodiment, the same operations as those in steps S1 to S2 (FIG. 7) described in the first embodiment are performed. In step S3 after step S2, a power consumption amount is calculated as described below.

First, in steps S21 and S22 shown in FIG. 22, the same operations as those in steps S21 and S22 (FIG. 9) described in the first embodiment are performed. In step S26 after step S22, the power consumption amount calculator 12 reads the facility information from the facility information DB 101.

In step S27, the power consumption amount calculator 12 calculates a power consumption amount of each train including a reduction effect of a regeneration loss power amount provided by the power utilization facility (the power amount and the regeneration loss power amount utilized by the power utilization facility). When, for example, there is not a power running train near a train which is regenerating power in a section in which a station building auxiliary power source device is installed, the power consumption amount calculator 12 may calculate a power consumption amount of each train including the reduction effect assuming that the station building auxiliary power source device absorbs regenerated power from the train which is regenerating power. Further, only when a voltage which is calculated to accompany a voltage of a feeder line and is near the station building auxiliary power device exceeds a threshold voltage, the power consumption amount calculator 12 may calculate a power consumption amount of each train including the reduction effect assuming that the station building auxiliary power source device absorbs regenerated power. Furthermore, when a time required for power regeneration is longer than a sustainable output time of the station building auxiliary power source device, the power consumption amount calculator 12 may determine an operation start time of the station building auxiliary power source device such that an output of the station building auxiliary power source device maximizes.

The above operations in steps S21 to S27 are performed for each train. Thus, as shown in FIG. 23, the power consumption amount (consumption power information) calculated by the power consumption amount calculator 12 includes not only the power consumption amount in the narrow sense and the regenerated power amount but also a power amount and a regeneration loss power amount utilized by the power utilization facility.

In step S24 after step S27, the power consumption amount calculator 12 writes the power consumption amount information calculated in step S27, in a power consumption amount information DB 8. Subsequently, the operation shown in FIG. 22 is finished, and the step moves to step S4 shown in FIG. 7. Further, in step S4 according to the present embodiment, the same operation as that in step S4 (FIG. 7) described in the first embodiment is performed.

The above operation schedule evaluation apparatus 1 and operation schedule processing system according to the present embodiment can improve accuracy to calculate a power consumption amount in a line on which a power utilization facility (a facility which effectively utilizes regeneration loss power) is installed. Further, the fifth embodiment is also applicable to all modified examples of the first embodiment and the second to fourth embodiments.

In addition, the embodiments of the present invention can be freely combined or can be optionally modified or omitted within the scope of the invention.

REFERENCE SIGNS LIST

1 OPERATION SCHEDULE EVALUATION APPARATUS, 3 OUTPUT UNIT, 4 OPERATION SCHEDULE INFORMATION DB, 5 CAR INFORMATION DB, 6 PASSENGER INFORMATION DB, 11 PASSENGER FLOW CALCULATOR, 12 POWER CONSUMPTION AMOUNT CALCULATOR, 13 CURTAILED SCHEDULE PLAN UPDATING UNIT, AND 14 CURTAILED SCHEDULE PLAN CREATING UNIT.

The invention claimed is:

1. An operation schedule evaluation apparatus comprising:
a passenger flow calculator which creates passenger flow information related to a passenger flow generated by transportation of a train, based on operation schedule information of each train and passenger information related to an entry and an exit of a passenger at a station; and
a power consumption amount calculator which calculates the number of passengers or a car occupancy of each train based on said passenger flow information created by said passenger flow calculator, said operation schedule information and car information of each train, and calculates a power consumption amount of each train per unit time which reflects car weight corresponding to the number of passengers or the car occupancy.

2. The operation schedule evaluation apparatus according to claim 1,
wherein said passenger flow calculator generates, for each of said passengers, a boarding schedule obtained by combining trains satisfying a predetermined condition based on said operation schedule information and said passenger information, and creates said passenger flow information including a correspondence relationship between a passenger and a boarding train which the passenger gets on, based on at least one of a required time required when a train of the boarding schedule is used and a number of times of transfer.

3. The operation schedule evaluation apparatus according to claim 1,
wherein said passenger flow calculator calculates a penalty value indicating an index of a penalty for lowering an evaluation of comfort and convenience of the passengers based on said operation schedule information and said passenger information, and creates said passenger flow information including a correspondence relationship between a passenger and a boarding train which the passenger gets on, based on at least one of said required time and a number of times of transfer, and said penalty value.

4. The operation schedule evaluation apparatus according to claim 1,
wherein information including the passenger flow information created by said passenger flow calculator and said power consumption amount calculated by said power consumption amount calculator displayed at a display.

5. The operation schedule evaluation apparatus according to claim 1,
wherein said power consumption amount calculator calculates said power consumption amount including a power amount efficiently used by a facility for efficiently utilizing regeneration loss power and regeneration loss power amount based on facility information related to said facility.

6. An operation schedule processing system comprising:
the operation schedule evaluation apparatus according to claim 1; and
a curtailed schedule plan update processing circuitry which changes at least one of said operation schedule information and said car information in response to an operator's changing operation.

7. The operation schedule processing system according to claim 6,
wherein said operation schedule processing system creates said passenger flow information and calculates said power consumption amount, and then re-creates said passenger flow information and re-calculates said power consumption amount by using at least one of said passenger flow information and said power consumption amount changed by said curtailed schedule plan update processing circuitry.

8. The operation schedule processing system according to claim 6, further comprising
a curtailed schedule plan creation processing circuitry which creates at least one of said operation schedule information which is new and said car information which is new, based on said operation schedule information, said car information, said passenger flow information, said power consumption amount and restriction condition information set in advance.

9. An operation schedule processing system comprising:
the operation schedule evaluation apparatus according to claim 1; and
a curtailed schedule plan creation processing circuitry which creates at least one of said operation schedule information which is new and said car information which is new, based on said operation schedule information, said car information, said passenger flow information, said power consumption amount and restriction condition information set in advance.

10. The operation schedule processing system according to claim 9, further comprising
wherein said operation schedule processing system creates said passenger flow information and calculates said power consumption amount, and then re-creates said passenger flow and re-calculates said power consumption amount by using at least one of said operation schedule information which is new and said car information which is new created by said curtailed schedule plan creation processing circuitry.

11. The operation schedule processing system according to claim 9,
wherein said restriction condition information includes a setting of prioritizing one of said passenger flow of said passenger flow information and said power consumption amount over an other one of said passenger flow of said passenger flow information and said power consumption amount.

12. The operation schedule processing system according to claim 9,
wherein said restriction condition information includes a setting as to whether or not to allow use of train service suspension, a change of a train set, train integration and train division.

13. An operation schedule processing system comprising:
the operation schedule evaluation apparatus according to claim 1; and
an operation schedule information database which stores said operation schedule information,
a passenger information database which stores said passenger information, and
a car information database which stores said car information, said operation schedule information database, said passenger information database and said car information database being able to communicate with said operation schedule evaluation apparatus.

* * * * *